United States Patent
Matsuzaki et al.

(10) Patent No.: US 6,796,347 B1
(45) Date of Patent: Sep. 28, 2004

(54) PNEUMATIC TIRE INCLUDING AUXILIARY GROOVES

(75) Inventors: Jun Matsuzaki, Tokyo (JP); Makoto Ishiyama, Kodaira (JP); Takayuki Fukunaga, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 90 days.

(21) Appl. No.: 09/806,414

(22) PCT Filed: Jun. 28, 2000

(86) PCT No.: PCT/JP00/05052

§ 371 (c)(1),
(2), (4) Date: Jul. 2, 2001

(87) PCT Pub. No.: WO01/08906

PCT Pub. Date: Feb. 8, 2001

(30) Foreign Application Priority Data

Jul. 30, 1999 (JP) ............................................ 11/218001
Jul. 30, 1999 (JP) ............................................ 11/218002

(51) Int. Cl.[7] ......................... B60C 11/11; B60C 11/12; B60C 111/00
(52) U.S. Cl. .............................. 152/209.15; 152/209.8; 152/209.18; 152/209.22; 152/DIG. 3
(58) Field of Search ................... 152/209.8, 209.15, 152/209.18, 209.22, 209.28, DIG. 3

(56) References Cited

U.S. PATENT DOCUMENTS 4,031,938 A * 6/1977 Verdier
4,078,596 A * 3/1978 Nakayama et al.
5,824,169 A * 10/1998 Landers et al.
5,967,210 A * 10/1999 Himuro
6,003,575 A * 12/1999 Koyama et al.
6,050,313 A * 4/2000 Tsuda

FOREIGN PATENT DOCUMENTS

| AT | 394 684 B | 5/1992 |
|---|---|---|
| EP | 0 485 883 A1 | 5/1992 |
| EP | 602989 * | 6/1994 |
| EP | 0 698 512 A1 | 2/1996 |
| EP | 0 715 972 A2 | 6/1996 |
| EP | 1 010 551 A2 | 6/2000 |
| JP | 58-18249 | 4/1983 |
| JP | 2-81773 | 3/1990 |
| JP | 2-182505 * | 7/1990 |
| JP | 5-69706 | 3/1993 |
| JP | 5-116510 | 5/1993 |
| JP | 8-192607 | 7/1996 |

* cited by examiner

Primary Examiner—Steven D. Maki
(74) Attorney, Agent, or Firm—Sughrue Mion, PLLC

(57) ABSTRACT

Auxiliary grooves 28 are formed in land portions 26 so that the wet performance is improved by the increase in the edge factors of the auxiliary grooves 28 and by the water absorbing actions of the auxiliary grooves 28. Since the auxiliary grooves 28 are arranged on the shorter diagonal lines of the land portions 26, the land portions 26 are divided into two triangles approximating equilateral triangles so that the reduction, as caused by providing the auxiliary grooves 28, of the rigidity of the land portions 26 can be suppressed to the minimum. As a result, the deformation of the land portions 26 is suppressed to maintain the dry performance.

14 Claims, 12 Drawing Sheets

F I G. 6
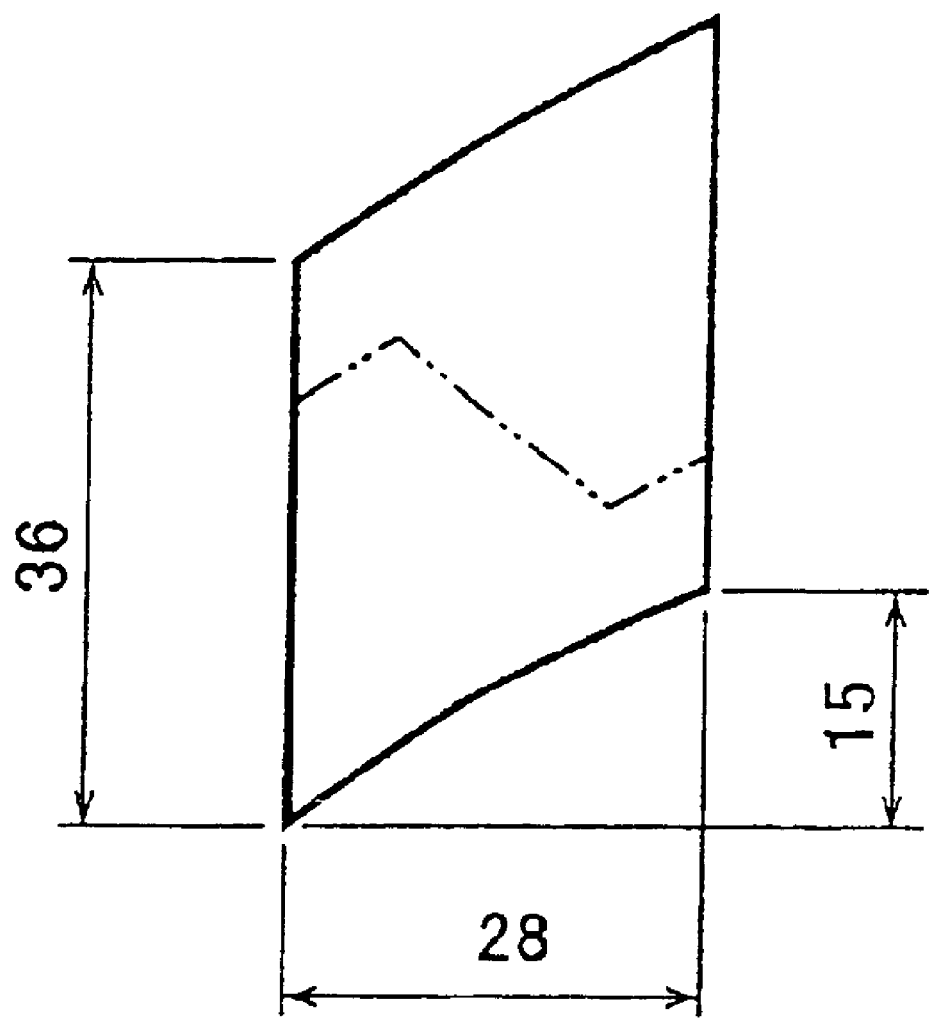

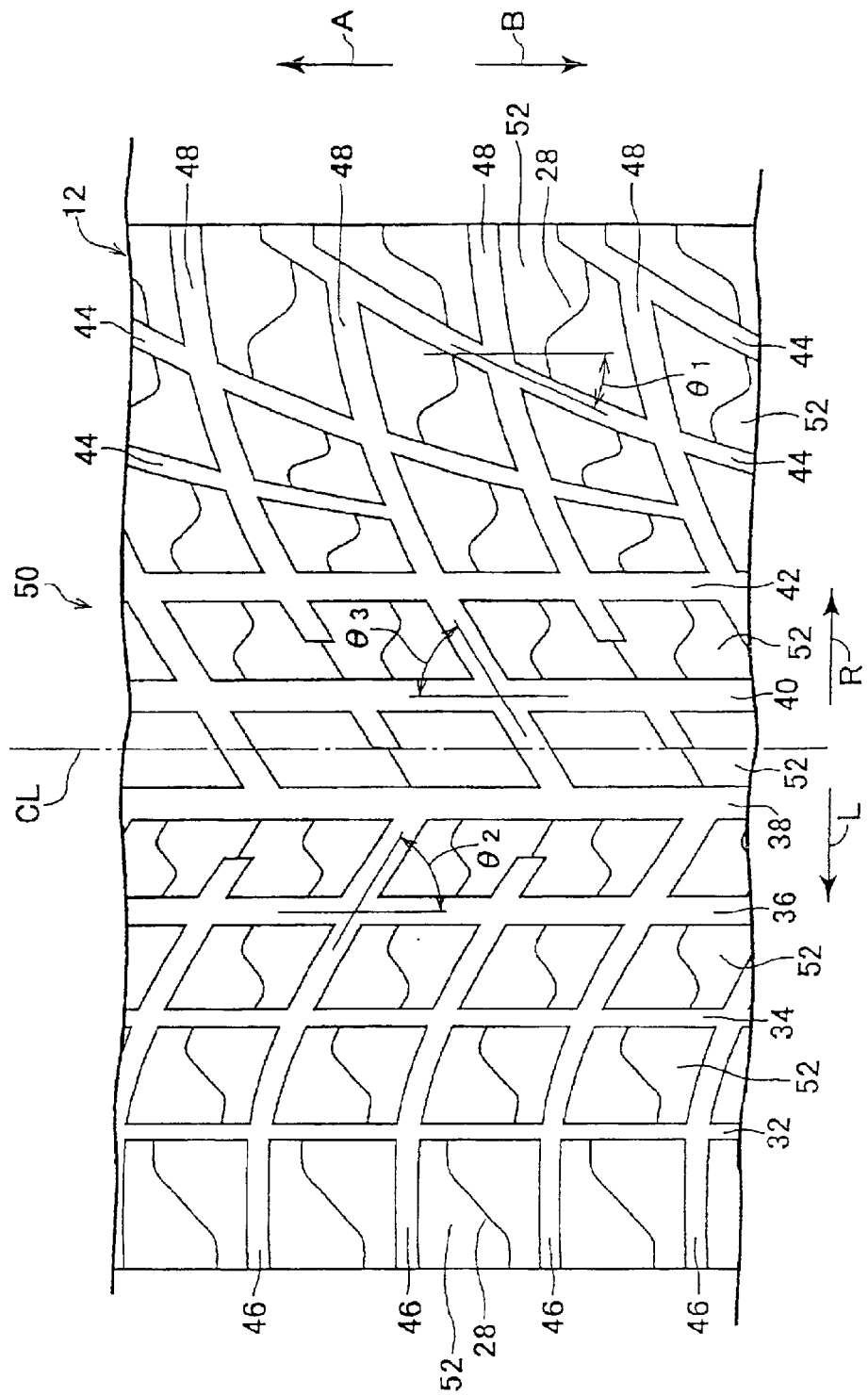

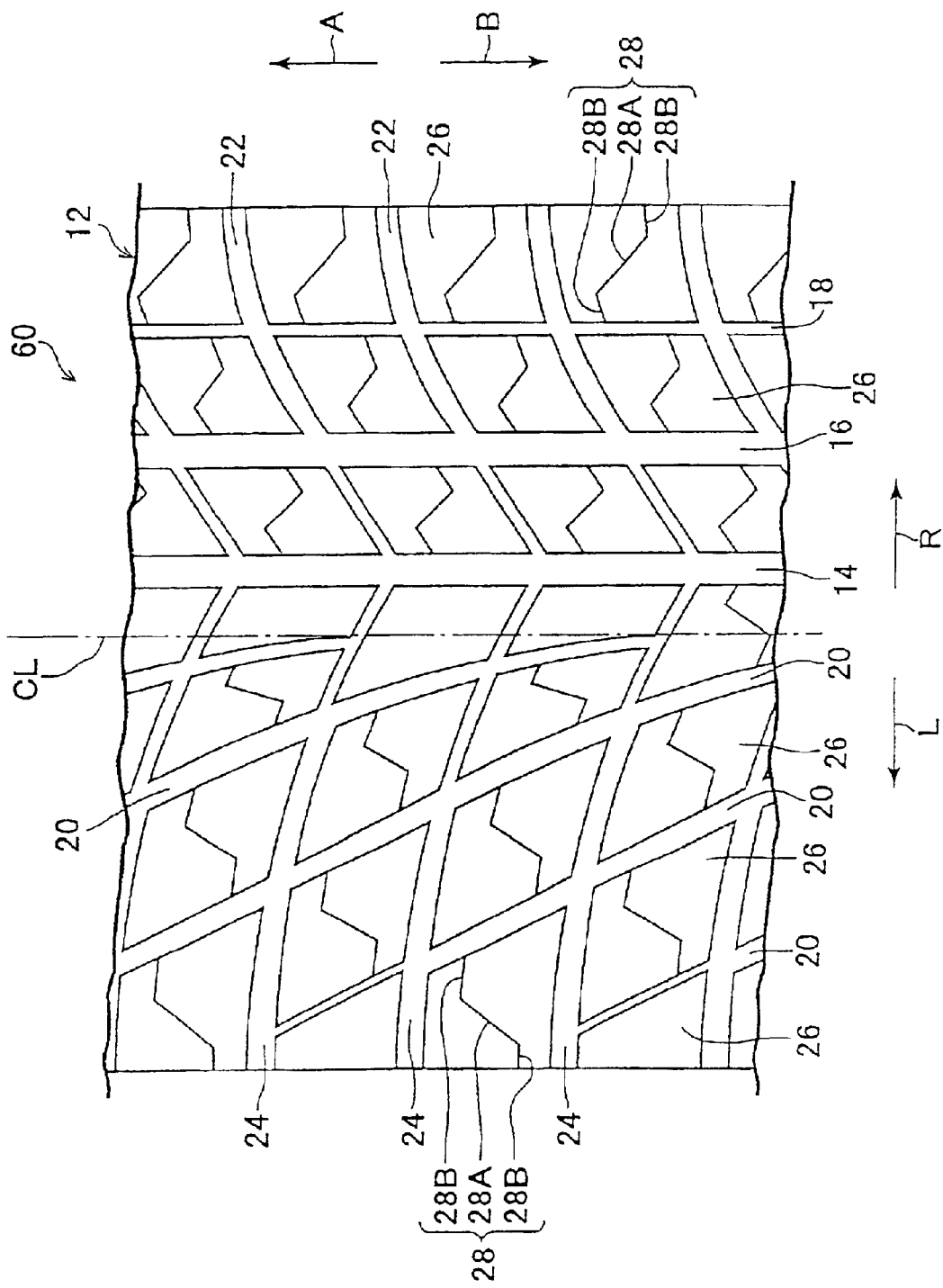

PNEUMATIC TIRE INCLUDING AUXILIARY GROOVES

TECHNICAL FIELD

The present invention relates to a pneumatic tire and, more particularly, to a pneumatic tire which is provided with a plurality of substantially quadrilateral land portions arranged on a tread and defined by two sets of main grooves of different angles with respect to a tire equatorial plane.

BACKGROUND ART

In the prior art, there is a pneumatic tire which is provided with a plurality of substantially quadrilateral land portions arranged on a tread and defined by two sets of main grooves of different angles with respect to a tire equatorial plane.

In this pneumatic tire, it is conceivable to form auxiliary grooves such as sipes in the land portions so as to improve the wet performance.

The auxiliary grooves such as the sipes are formed in the land portions, so that the edge factors are increased to improve the wet performance, but the rigidity of the land portions may be degraded and the deterioration of the dry performance may be caused.

In FIG. 13A, for example, a pair of main grooves 100 extending in the circumferential directions (i.e., in the directions as indicated by arrows A and B) and a pair of main grooves 102 intersecting the main grooves 100 define land portions 104 having generally parallelogram shapes. When the land portions 104 are halved in the tire circumferential directions by forming auxiliary grooves 106 in parallel with the main grooves 102, there arises a problem that the rigidity of the land portions 104 in the tire circumferential directions decreases.

On the other hand, when the auxiliary grooves 106 are formed in the generally parallelogram land portions 104 along the longer diagonal lines, as shown in FIG. 13B, there are formed two small land portions each of which has a substantially slender triangular shape. This formation raises a problem that the rigidity of the land portions 104 in the directions (i.e., in the directions of arrow C) perpendicular to the longitudinal direction of the auxiliary grooves 106 seriously decreases.

Considering the aforementioned facts, the invention has an object to provide a pneumatic tire which can improve the wet performance while keeping the rigidity of the land portions.

MEANS FOR SOLVING THE PROBLEMS

According to a first aspect of the invention, there is provided a pneumatic tire, in which a plurality of substantially quadrilateral land portions are arranged on a tread and defined by two sets of main grooves having different angles with respect to a tire equatorial plane and in which auxiliary grooves are arranged in said land portions, characterized: in that said land portions have diagonal lines of different lengths; and in that said auxiliary grooves are arranged at the central portions of said land portions and substantially along the shorter diagonal lines.

According to a second aspect of the invention, a pneumatic tire is characterized in that said auxiliary grooves are not opened in said main grooves.

According to a third aspect of the invention, a pneumatic tire is characterized in that said auxiliary groove have a length of no less than 30% but less than 70% of the length of said shorter diagonal lines.

According to a fourth aspect of the invention, a pneumatic tire is characterized in that the angle formed between said shorter diagonal lines and said auxiliary grooves is within ±20 degrees.

According to a fifth aspect of the invention, a pneumatic tire is characterized in that said auxiliary grooves are arranged substantially on said shorter diagonal lines.

According to a sixth aspect of the invention, a pneumatic tire is characterized in that said auxiliary grooves have a depth of no less than 30% of the depth of said main grooves.

According to a seventh aspect of the invention, a pneumatic tire is characterized in that end portion grooves opened in said main grooves are connected to the end portions of said auxiliary grooves.

According to an eighth aspect of the invention, a pneumatic tire is characterized in that said end portion grooves are opened in said main grooves which are the closet to the end portions auxiliary grooves.

According to a ninth aspect of the invention, a pneumatic tire is characterized in that the angle formed between said end portion grooves and said auxiliary grooves is obtuse.

According to tenth aspect of the invention, a pneumatic tire is characterized in that the angle formed between said end portion grooves and the neighborhood main grooves, in which said end portion grooves are not opened, is no more than 30 degrees.

According to an eleventh aspect of the invention, a pneumatic tire is characterized: in that said end portion grooves are formed on the two end portions of said auxiliary grooves; and in that one auxiliary groove is opened in one of the main grooves opposed to each other whereas the other auxiliary groove is opened in the other of the main opposed to each other.

According to a twelfth aspect of the invention, a pneumatic tire is characterized in that said end portion grooves are as deep as or shallower than said auxiliary grooves.

According to a thirteenth aspect of the invention, a pneumatic tire is characterized in that the depth of said end portion grooves is no less than 10% and no more than 30% of the depth of said main grooves.

According to a fourteenth aspect of the invention, a pneumatic tire is characterized in that the shortest distance between the end portions of said auxiliary grooves and said main grooves which are the closest to said end portions is no less than 15% of the length of said shorter diagonal lines.

According to a fifteenth aspect of the invention, there is provided a pneumatic tire, in which a plurality of substantially quadrilateral land portions are arranged on a tread and defined by two sets of main grooves having different angles with respect to a tire equatorial plane and in which auxiliary grooves are arranged in said land portions, characterized: in that said land portion has an auxiliary groove extending throughout from one side to another side; and in that said auxiliary groove includes: a central auxiliary groove portion inclined in the same direction as that of the shorter diagonal line of the land portion and arranged at the central portion of said land portion; end portion auxiliary groove portions extending in directions different from that of said central auxiliary groove portion and opened in the closest main grooves; and connection portions for smoothly joining said central auxiliary groove portion and said end portion auxiliary groove portions.

According to a sixteenth aspect of the invention, a pneumatic tire is characterized in that said connection portions are formed into arcuate shapes having a radius of curvature of no less than 3 mm and no more than 10 mm.

According to a seventeenth aspect of the invention, a pneumatic tire is characterized in that said central auxiliary groove portion has a length of less than 70% of the length of said shorter diagonal line.

According to an eighteenth aspect of the invention, a pneumatic tire is characterized in that the angle formed between said shorter diagonal line and said central auxiliary groove portion is within ±20 degrees.

According to a nineteenth aspect of the invention, a pneumatic tire is characterized in that said central auxiliary groove portion is arranged substantially on said shorter diagonal line.

According to a twentieth aspect of the invention, a pneumatic tire is characterized in that said central auxiliary groove portion has a depth of no less than 30% of the depth of said main grooves.

According to a twenty-first aspect of the invention, a pneumatic tire is characterized in that the angle formed between said end portion auxiliary groove portions and the neighborhood main grooves, in which said end portion auxiliary groove portions are not opened, is no more than 30 degrees.

According to a twenty-second aspect of the invention, a pneumatic tire is characterized in that said end portion auxiliary groove portions are as deep as or shallower than said central auxiliary groove portion.

According to a twenty-third aspect of the invention, a pneumatic tire is characterized in that the depth of said end portion auxiliary groove portions is no less than 10% and no more than 30% of the depth of said main grooves.

According to a twenty-fourth aspect of the invention, a pneumatic tire is characterized in that said auxiliary groove includes chamfered portions formed at the two corner portions of the opened portions of said auxiliary groove in the tread, when viewed in a section normal to the longitudinal direction at each point of the longitudinal direction.

According to a twenty-fifth aspect of the invention, a pneumatic tire is characterized in that said chamfered portions have a gently bulging sectional shape in said section normal to the longitudinal direction of said auxiliary groove.

According to a twenty-sixth aspect of the invention, a pneumatic tire is characterized in that the maximum of the depth H of said chamfered portions is no less than 5% and no more than 50% of the groove depth D of said auxiliary groove.

According to a twenty-seventh aspect of the invention, a pneumatic tire is characterized in that the maximum of the length L of said chamfered portions, as measured in parallel with the tread, in said section normal to the longitudinal direction of said auxiliary groove is no less than 5% and no more than 50% of the maximum width W, as taken in the tire axial direction, of the land portion having said auxiliary groove.

According to a twenty-eighth aspect of the invention, a pneumatic tire is characterized in that the depth H of said chamfered portions at each point in the longitudinal direction of said auxiliary groove is changed gently so that the change in the ground contact pressure which occurs inside the land portion under a lateral force may be small.

According to a twenty-ninth aspect of the invention, a pneumatic tire is characterized in that the depth H of said chamfered portions takes its maximum at the land portion ends of said auxiliary groove and at the central portion of the land portion.

EFFECTS OF THE INVENTION

Here will be described the effects of the pneumatic tire according to the first aspect of the invention.

The substantially quadrilateral land portions having the diagonal lines of the different lengths and defined by the two sets of main grooves of the different angles with respect to the tire equatorial plane can be exemplified by parallelogram land portions or the rhombic land portions.

By arranging the auxiliary grooves in the substantially quadrilateral land portions, the edge factors can be increased to improve the wet performance.

On the other hand, the auxiliary grooves are arranged substantially along the shorter diagonal lines of the land portions. Therefore, the parallelogram land portions or the rhombic land portions, for example, are divided into the two triangles approximating the equilateral triangles so that the decrease in the rigidity, as caused by providing the auxiliary grooves, of the land portions can be suppressed to the minimum.

Therefore, the pneumatic tire according to the first aspect of the invention can improve the wet performance while maintaining the excellent dry performance.

Therefore, the pneumatic tire as set forth in claim 1 can improve the wet performance while maintaining the excellent dry performance.

Here will be described the effects of the pneumatic tire according to the second aspect of the invention.

In the pneumatic tire according to the second aspect of the invention, the auxiliary grooves are not opened in the main grooves so that the decrease in the rigidity of the land portions can be suppressed as compared with the land portions having the auxiliary grooves opened in the main grooves, to maintain the high dry performance.

Here will be described the effects of the pneumatic tire according to the third aspect of the invention.

In the pneumatic tire according to the third aspect of the invention, when the auxiliary grooves not opened in the main grooves are formed in the land portions, the length of the auxiliary grooves is set to no less than 30% but less than 70% of the length of the shorter diagonal lines so that the decrease in the rigidity of the land portions can be suppressed while maintaining excellent water absorption, to make the wet performance and the dry performance compatible.

Here will be described the effects of the pneumatic tire according to the fourth aspect in the invention.

If the length of the auxiliary grooves exceeds 70% of the length of the shorter diagonal lines, on the other hand, the rigidity of the land portions deteriorates, to lower the dry performance.

Here will be described the effects of the pneumatic tire as set forth in claim 4.

The pneumatic tire according to the fourth aspect of the invention has an excellent effect that the decrease in the rigidity, as caused by providing the auxiliary grooves in the land portions, of the land portions can be suppressed to maintain the dry performance reliably.

If the angle formed between the shorter diagonal lines and the auxiliary grooves is beyond the range within ±20 degrees, the rigidity of the land portions decreases to lower the dry performance.

In order to suppress the decrease in the rigidity of the land portions, the angle formed between the shorter diagonal lines and the auxiliary grooves is preferably set in the range within ±10 degrees and is more preferably set in the range within ±5 degrees.

Here will be described the effects of the pneumatic tire according to a fifth aspect of the invention.

By arranging the auxiliary grooves substantially on the shorter diagonal lines, the land portions can be divided into the two triangles of substantially equal sizes so that the decrease in the rigidity of the land portions can be most effectively suppressed as compared with the case in which the auxiliary grooves are arranged at a given angle with respect to the shorter diagonal lines.

As a result, there is obtained an excellent effect that the dry performance can be maintained more reliably.

Here will be described the effects of the pneumatic tire according to the sixth aspect of the invention.

The depth of the auxiliary grooves is no less than 30% of the depth of the main grooves so that the water absorption can be maintained until the intermediate stage of wear.

Here will be described the effects of the pneumatic tire according to the seventh aspect of the invention.

When the auxiliary grooves (including the so-called "sipes") formed in the land portions are closed at two sides (that is, when the auxiliary grooves are not connected to any main groove), the water confined between the land portion ground contacting surfaces and the road surface instantly flows, as the land portions tread in the water pool of the wet road surface, from the ground contacting surfaces into the auxiliary grooves.

In the case in which the auxiliary grooves are closed on their two sides, when the auxiliary grooves are filled up with the water, the draining effect by the auxiliary grooves cannot be expected any more, because the water is no longer absorbed by the auxiliary grooves.

However, when the end portion grooves opened in the main grooves are connected to the end portions of the auxiliary grooves, the water sucked into the auxiliary grooves can be discharged through the end portion grooves into the main grooves so that the water between the ground contacting surfaces of the land portions and the road surface can be easily discharged, to improve the wet performance.

It is preferred from the standpoint of the better drainage into the main grooves that the end portion grooves are wider than the auxiliary grooves.

As a result, the pneumatic tire according to a seventh aspect of the invention has an excellent effect that the water between the ground contacting surfaces of the land portions and the road surface can be easily discharged to improve the wet performance as compared with the case of providing only the auxiliary grooves.

Here will be described the effects of the pneumatic tire according to the eighth aspect of the invention.

In the pneumatic tire according to the eighth aspect of the invention, the end portion grooves are opened in the main grooves which are the closest to the end portions of the auxiliary grooves, so that the length of the end portion grooves can be reduced, to discharge the water in the auxiliary grooves efficiently to the main grooves.

As a result, the pneumatic tire according to the eighth aspect of the invention has an excellent effect that it can further improve the wet performance.

Here will be described the effects of the pneumatic tire according to the ninth aspect of the invention.

In the pneumatic tire according to the ninth aspect of the invention, by forming an obtuse angle between the end portion grooves and the auxiliary grooves, the flow resistance can be suppressed to drain the water in the auxiliary grooves efficiently into the main grooves.

As a result, the pneumatic tire according to the ninth aspect of the invention has an excellent effect that it can further improve the wet performance.

Here will be described the effects of the pneumatic tire according to the tenth aspect of the invention.

In the pneumatic tire according to the tenth aspect of the invention, the angle formed between the end portion grooves and the neighborhood main grooves, in which the end portion grooves are not opened, is set within 30 degrees so that the decrease in the rigidity of the end portion grooves in the vicinity where the end portion grooves are opened to the main grooves can be suppressed, to suppress any peel, after the run, in the vicinity where the end portions are opened to the main grooves.

Here will be described the effects of the pneumatic tire according to the eleventh aspect of the invention.

In the pneumatic tire according to the eleventh aspect of the invention, one auxiliary groove is opened in one of the main grooves opposed to each other, and the other auxiliary groove is opened in the other of the main grooves opposed to each other. Therefore, the water sucked into the auxiliary groove can be efficiently discharged through the end portion grooves to both of the main grooves so that the water between the ground contacting surfaces of the land portions and the road surface can be more easily discharged to improve the wet performance better.

Here will be described the effects of the pneumatic tire according the twelfth aspect of the invention.

In the pneumatic tire according to the twelfth aspect of the invention, the end portion grooves are formed as deep as or shallower than the auxiliary grooves, thereby to suppress the local decrease in rigidity of the outer peripheral portions of the land portions. More preferably, by making the end portion grooves shallower than the auxiliary grooves, the rigidity of the outer peripheral edges of the land portions can be maintained as a whole, to achieve a rigidity which sufficiently resists the bending deformation of the land portions.

Here will be described the effects of the pneumatic tire according to the thirteenth aspect of the invention.

In the invention according to the thirteenth aspect of the invention, the depth of the end portion grooves is set to no less than 10% and no more than 30% of the depth of the main grooves so that the drainage at the initial stage of wear and the rigidity of the land portions are made compatible. If the depth of the end portion grooves is less than 10% of the depth of the main grooves, there cannot be obtained the drainage by the end portion grooves at the initial stage of wear. When the end portion grooves disappear due to wear, the tread surface is so roughened as to form irregularities therein, so that the sufficient draining effect is obtained by the recesses formed in the tread or the ground contacting face.

If the depth of the end portion grooves exceeds 30%, on the other hand, the rigidity of the land portions decreases so that the land portions are easily bent and deformed, to lower the dry performance.

Generally in the pneumatic tire according to the twelfth aspect of the invention, the end portion grooves have a depth of no less than 1 mm and no more than 4 mm.

As the depth of the end portion grooves is set to no less than 1 mm and no more than 4 mm, it is possible to make the drainage at the initial stage of wear compatible with the rigidity of the land portions.

Here, the sufficient draining action of the end portion grooves at the initial stage of wear cannot be obtained when the depth of the end portion grooves is less than 1 mm. When the end portion grooves disappear due to wear, the tread surface is so roughened as to form the irregularities therein, so that the sufficient draining effect is obtained by the recesses formed in the ground contacting surfaces of the land portions.

If the depth of the end portion grooves exceeds 4 mm, on the other hand, the rigidity of the land portions decreases and becomes susceptible to bending deformation, to deteriorate the dry performance.

Here will be described the effects of the pneumatic tire according to the fourteenth aspect of the invention.

When the auxiliary grooves are not opened in the main grooves, the rigidity of the land portions can be maintained by setting the shortest distance between the end portions of the auxiliary grooves and the main grooves which are the closest to the end portions to 15% or more of the length of the shorter diagonal lines.

If the shortest distance between the end portions of the auxiliary grooves and the main grooves the closest to the end portions is less than 15% of the length of the shorter diagonal lines, the end portions of the auxiliary grooves are so much close to the main grooves that the rigidity of the land portions decreases.

Here will be described the effects of the pneumatic tire according to the fifteenth aspect of the invention.

The substantially quadrilateral land portions, as defined by the two sets of main grooves of the different angles with respect to the tire equatorial plane, can be exemplified by the parallelogram land portions or the rhombic land portions.

Since the auxiliary grooves opened in the main grooves are arranged in the substantially quadrilateral land portions as described above, there is an increase in the edge factors for cutting the water film existing between the road surface and the ground contacting surfaces of the land portions. Moreover, the auxiliary grooves absorb the water existing between the road surface and the ground contacting surfaces of the land portions and drain the absorbed water to the main grooves, so that the wet performance is improved.

The end portion auxiliary groove portions, connected to the central auxiliary groove portion arranged at the centers of the land portions, are opened in the closest main grooves so that the water existing between the central portions of the land portions and the road surface is discharged by the shortest distance to the main grooves. Moreover, the central auxiliary groove portion and the end portion auxiliary groove portions are smoothly jointed by the connection portions, so that the water absorbed by the central auxiliary groove portion is smoothly discharged through the connection portions to the main grooves.

In addition, as the central auxiliary groove portion and the end portion auxiliary groove portions are smoothly jointed by the connection portions, the stress concentration at these linking portions between the central auxiliary groove portion and the end portion auxiliary groove portions can be suppressed to improve the crack-resistance properties.

Moreover, as the central auxiliary groove portion and the end portion auxiliary groove portions are smoothly jointed by the connection portions, the uneven distribution of the stress, as might otherwise be caused at the connection portions between the central auxiliary groove portion and the end portion auxiliary groove portions, can be suppressed, thereby preventing occurrence of the heel-and-toe wear.

In the pneumatic tire according to the fifteenth aspect of the invention, moreover, the center auxiliary groove portion is arranged at the central portion of the land portions with an inclination in the same direction as that of the shorter diagonal lines, so that the land portions are divided into the two triangles approximating the equilateral triangles thereby to prevent the land portions from becoming weak in a specific direction.

Therefore, the pneumatic tire as set forth in claim 15 has an excellent effect that it can improve the wet performance while maintaining the dry performance.

Here will be described the effects of the pneumatic tire according to the sixteenth aspect of the invention.

When the radius of curvature of the connection portions falls short of 3 mm, the stress concentration in the vicinity of the connection portions cannot be prevented, thereby increasing the possibility of forming the cracks. In addition, the stress becomes uneven in the vicinity of the connection portions to facilitate the heel-and-toe wear. At the connection portions, moreover, the flow resistance is increased to lower the drainage.

When the radius of curvature of the connection portions exceeds 10 mm, the center auxiliary groove portion is reduced so much that it cannot exhibit its unique effect (i.e., the effect to divide the land portions into the two triangles approximating the equilateral triangles so as to prevent the land portions from being weakened in a pacific direction).

Therefore, the connection portions preferably have the arcuate shape having the radius of curvature (as measured on the groove center line) of no less than 3 mm and no more than 10 mm.

As a result, the pneumatic tire according to the sixteenth aspect of the invention has excellent effects to suppress the occurrence of the cracks and the heel-and-toe wear, to prevent the land portions from being weakened in a specific direction, and to drain the absorbed water smoothly into the main grooves.

Here will be described the effects of the pneumatic tire according to the seventeenth aspect of the invention.

In the pneumatic tire according to the seventeenth aspect of the invention, the length of the center auxiliary groove portion is less than 70% of the length of the shorter diagonal lines so that the decrease in the rigidity of the land portions can be suppressed, to maintain the excellent dry performance.

Therefore, the pneumatic tire according to the seventeenth aspect of the invention has an excellent effect to make the dry performance compatible with and the wet performance.

Here will be described the effects of the pneumatic tire according to the eighteenth aspect of the invention.

When the angle formed between the shorter diagonal line and the center auxiliary groove portion is beyond the range within ±20 degrees, the rigidity of the land portions decreases, to deteriorate the dry performance.

In order to suppress the decrease in the rigidity of the land portions, the angle formed between the shorter diagonal lines and the center auxiliary groove portion is preferably set within ±10 degrees and more preferably within ±5 degrees.

Therefore, the pneumatic tire according to the eighteenth aspect of the invention has an excellent effect to maintain the dry performance reliably while suppressing the decrease in the rigidity of the land portions, which is caused by providing the auxiliary grooves in the land portions.

Here will be described the effects of the pneumatic tire according to the nineteenth aspect of the invention.

By arranging the center auxiliary groove potion substantially on the shorter diagonal lines, the land portions can be divided into the two triangles of substantially equal sizes so that the reduction of the rigidity of the land portions can be most efficiently suppressed, as compared with the case in which the center auxiliary groove portion is arranged at an angle with respect to the shorter diagonal lines.

Therefore, the pneumatic tire according to the nineteenth aspect of the invention has an excellent effect to maintain the dry performance more reliably.

Here will he described the effects of the pneumatic tire according the twentieth aspect of the invention.

The depth of the center auxiliary groove portion is no less than 30% of the depth of the main grooves so that the excellent drainage can be maintained.

Therefore, the pneumatic tire according to the twentieth aspect of the invention has an excellent effect to maintain the water absorption until the intermediate stage of wear.

Here will be described the effects of the pneumatic tire according to the twenty-first aspect of the invention.

In the pneumatic tire according to the twenty-first aspect of the invention, the angle formed between the end portion auxiliary groove portions and the neighborhood main grooves, in which the end portion auxiliary groove portions are not opened, is set within 30 degrees so that the decrease in the rigidity in the vicinity of the openings of the end portion auxiliary groove portions to the main grooves is suppressed, thereby to suppress the peel in the vicinity of the openings to the main grooves after the run.

Here will be described the effects of the pneumatic tire according to the twenty-second aspect of the invention.

In the pneumatic tire according to the twenty-second aspect of the invention, the end portion auxiliary groove portions are as deep as or shallower than the center auxiliary groove portion thereby to suppress the localized decrease in rigidity of the outer peripheral edge portions of the land portions. More preferably, by making the end portion auxiliary groove portions shallower than the auxiliary grooves, the rigidity of the outer peripheral edge portions of the land portions can be kept high as a whole to reliably resist bending deformation.

Here will be described the effects of the pneumatic tire according to the twenty-third aspect of the invention.

In the invention according to the twenty-third aspect of the invention, the depth of the end portion auxiliary groove portions is set to no less than 10% but less than 30% to make the drainage at the initial stage of wear compatible with and the rigidity of the land portions.

If the depth of the end portion auxiliary groove portions is less than 10% of the depth of the main grooves, it is impossible to obtain the sufficient draining action by the end portion auxiliary groove portions at the initial stage of wear.

If the depth of the end portion auxiliary groove portions exceeds 30% of the depth of the main grooves, on the other hand, the rigidity of the land portions decrease so much as to facilitate the bending deformation, thereby to deteriorate the dry performance.

In the pneumatic tire according to the twenty-second aspect of the invention, generally, the groove depth of the end portion auxiliary groove portions is no less than 1 mm and no more than 4 mm.

As the depth of the end portion auxiliary groove portions is set to no less than 1 mm and no more than 4 mm, the drainage at the initial stage of wear and the rigidity of the land portions are made compatible.

If the depth of the end portion auxiliary groove portions is less than 1 mm, it is impossible to obtain a sufficient draining action by the end portion auxiliary groove portions at the initial stage of wear.

If the depth of the end portion auxiliary groove portions exceeds 4 mm, on the other hand, the rigidity of the land portions decreases so much as to facilitate the bending deformation, thereby to deteriorate the dry performance.

Here will be described the effects of the pneumatic tire according to the twenty-fourth aspect of the invention.

The auxiliary groove includes chamfered portions formed, at the two corner portions of the opening portions of said auxiliary groove at the tread, overall the longitudinal length of the auxiliary groove at each point of the longitudinal direction, so that the contact pressure of the edge portions of the auxiliary grooves at the ground contacting time can be lowered. For the applications where the high lateral and longitudinal forces frequently applied, the effect to reduce the contact pressure as described above is exhibited quite significantly, to improve the resistance against partial wear, the wear performance and the running performance.

Here will be described the effects of the pneumatic tire according to the twenty-fifth aspect of the invention.

By forming the sectional shape of the chamfered portions into a gently bulging shape or a corner-rounded shape, it is possible to suppress the change in an abrupt ground contact pressure.

Here will be described the effects of the pneumatic tire according to the twenty-sixth aspect of the invention.

When the maximum of the depth H of the chamfered portions of the auxiliary grooves is less than 5% of the groove depth of the auxiliary grooves, there is a decrease in the effect to reduce the change in the contact pressure under the action of the lateral and longitudinal forces.

When the maximum of the depth H of the chamfered portions of the auxiliary grooves is larger than 50% of the groove depth D of the auxiliary grooves, the ground contact area is reduced too much.

Therefore, it is preferred that the maximum of the depth H of the chamfered portions is set to no less than 5% and no more than 50% of the groove depth D of the auxiliary grooves.

Therefore, the pneumatic tire according to the twenty-sixth aspect of the invention has an excellent effect that the contact pressure of the edge portions of the auxiliary grooves can be reduced to an optimum level.

Here will be described the effects of the pneumatic tire according to the twenty-seventh aspect of the invention.

When the maximum of the length L of the chamfered portions, as measured in parallel with the contact face, exceeds 50% of the maximum width W in the tire axial direction of the land portions having the auxiliary grooves, the ground contact area is reduced too much.

If the maximum of the length L of the chamfered portions, as measured in parallel with the contact face, is less than 5% of the maximum width W in the tire axial direction of the land portions having the auxiliary grooves, there is a decrease in the effect to reduce the change in the contact pressure under the action of the lateral and longitudinal forces.

Therefore, it is preferred that the maximum of the length L of the chamfered portions is set to no less than 5% and no more than 50% of the maximum width W of the land portions in the tire axial direction.

Therefore, the pneumatic tire according to the twenty-seventh aspect of the invention has an excellent effect to reduce the contact pressure of the edge portions of the auxiliary grooves to the optimum level.

Here will be described the effects of the pneumatic tire according to the twenty-eighth aspect of the invention.

The distribution of the contact pressure in the land portions under the lateral force varies according to the shape of the land portions and the routes of the auxiliary grooves, but by gently changing the depth of the chamfered portions of the auxiliary grooves at the individual points in the longitudinal direction, the distribution of the contact pressure can be made even to exhibit the effects to improve the resistance against partial wear, the wear performance and the running performance.

Here will be described the effects of the pneumatic tire according to the twenty-ninth aspect of the invention.

If the land portions do not have the chamfered portions at the land portion ends and the central portions of the auxiliary grooves, the contact pressure rises to an especially high level. By making the depth H of the chamfered portions larger than that of the remaining portions, there is an effect to homogenize the contact pressure.

BRIEF DESCRIPTION OF DRAWINGS

FIG. 6 is an enlarged diagram of a land portion.

FIG. 9 is a development of the tread of a pneumatic tire according to a fifth embodiment of the invention.

FIG. 11 is a development of the tread of a pneumatic tire for a front wheel according to Example (of Test Example F).

BEST MODES FOR CARRYING OUT THE INVENTION

First Embodiment

A first embodiment of the pneumatic tire of the present invention will be described with reference to FIGS. 1 to 3.

Figure 1:
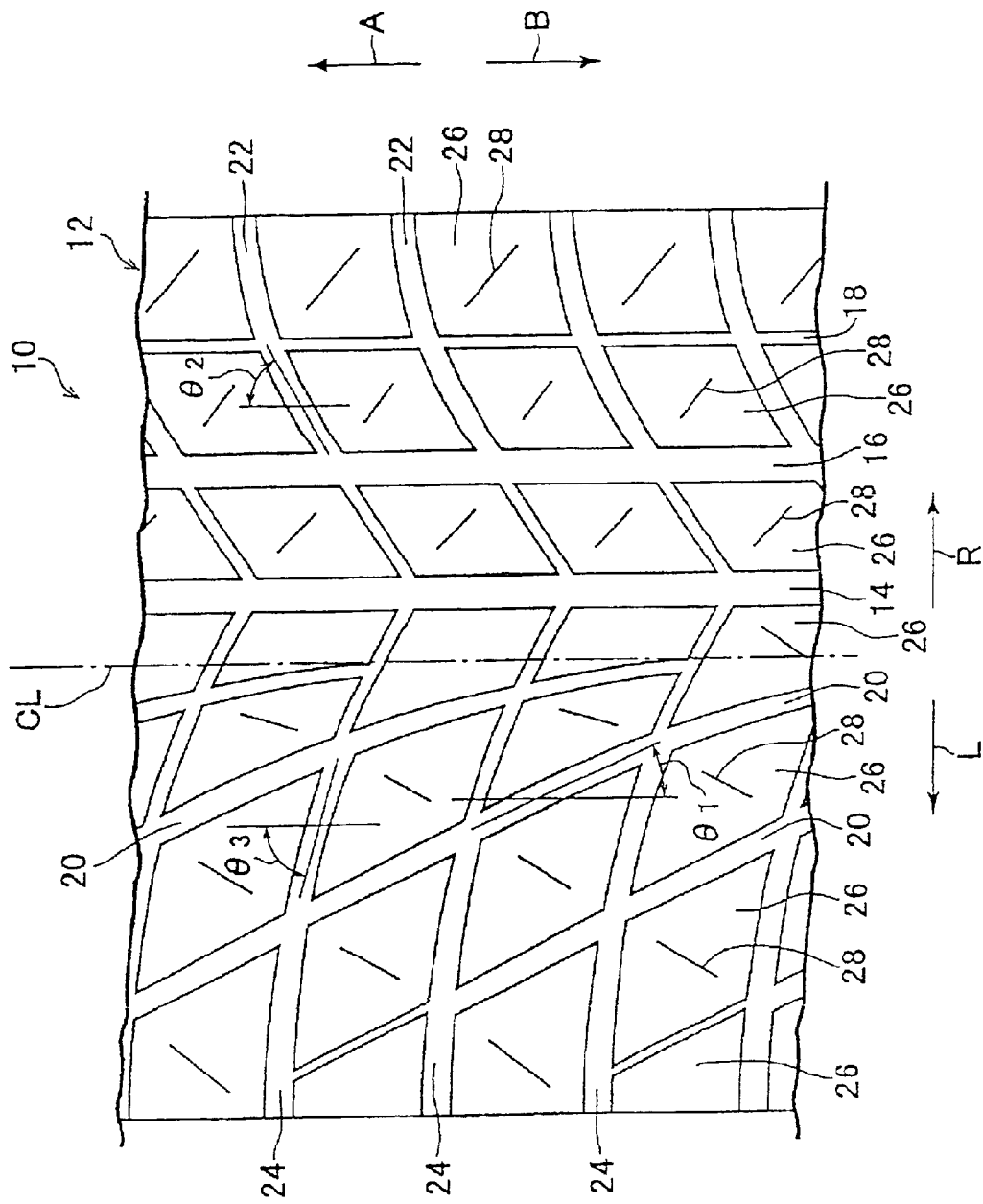
FIG. 1 is a development of the tread of a pneumatic tire according to a first embodiment of the invention.

In the tread 12 of a pneumatic tire 10 of this embodiment, as shown in FIG. 1, there are formed, on the righthand side (as indicated by arrow R) of a tire equatorial plane CL, a main groove 14, a main groove 16 and a main groove 18 which extend in the tire circumferential directions (as indicated by arrow A and by arrow B). On the lefthand side of the tire equatorial plane CL (as indicated by arrow L), there are formed a plurality of main grooves 20 which are inclined at an angle no more than 30 degrees with respect to the tire circumferential direction.

An angle $\theta1$ of the main grooves 20 of this embodiment with respect to the tire circumferential direction (which is measured on the acute angle side, and is an angle formed between the circumferential direction and the tangential line of the groove center line, if curved) is set, so as to be larger on the lefthand shoulder side than on the side of the tire equatorial plane CL, such that the angle $\theta1$ is about 5 degrees with respect to the tire circumferential direction at the end portion of the main groove 20 on the tire equatorial plane CL side and about 28 degrees with respect to the tire circumferential direction at the end portion of the main groove 20 on the shoulder side.

In the tread 12, in addition, there are formed, on the righthand side of the tire equatorial plane CL, a plurality of main grooves 22 which intersect the main groove 14, the main groove 16 and the main groove 18. On the lefthand side of the equatorial plane CL, there are formed a plurality of main grooves 24 which intersect the main grooves 20.

An angle $\theta2$ of the main grooves 22 of this embodiment with respect to the tire circumferential direction (which is measured on the acute angle side, and is an angle formed between the circumferential direction and the tangential line of the groove center line, if curved) is set so as to be larger on the righthand shoulder side than on the tire equatorial plane CL side, such that the angle $\theta2$ is about 60 degrees with respect to the tire circumferential direction at the end portion of the main groove 22 on the tire equatorial plane CL side and about 78 degrees with respect to the tire circumferential direction at the end portion of the main groove 22 on the shoulder side.

Further, an angle $\theta3$ of the main grooves 24 of this embodiment with respect to the tire circumferential direction (which is measured on the acute angle side, and is an angle formed between the circumferential direction and the tangential line of the groove center line, if curved)) is set so as to be larger on the lefthand shoulder side than on the tire equatorial plane CL side, such that the angle $\theta3$ is about 60 degrees with respect to the tire circumferential direction at the end portion of the main groove 24 on the tire equatorial plane CL side and about 88 degrees with respect to the tire circumferential direction at the end portion of the main groove 24 on the shoulder side.

In this embodiment, all of these main groove 14, main groove 16, main groove 18, main grooves 20, main grooves 22 and main grooves 24 are given an equal depth.

On the tread 12, there are formed a plurality of quadrilateral land portions 26 by those main groove 14, main groove 16, main groove 18, main grooves 20, main grooves 22 and main grooves 24.

The individual land portions 26 are formed into quadrilateral shapes having two diagonal lines of different lengths.

Auxiliary grooves 28 are formed in most of the plurality of land portions 26 excepting some land portions.

Here will be specified the auxiliary grooves 28. These land portions 26 represented by the third one counted from the righthand-side end will be described in the following description with reference to FIGS. 2 and 3. Here, the common specifications will be adopted for the auxiliary grooves 28 of the remaining land portions 26.

Figure 2:
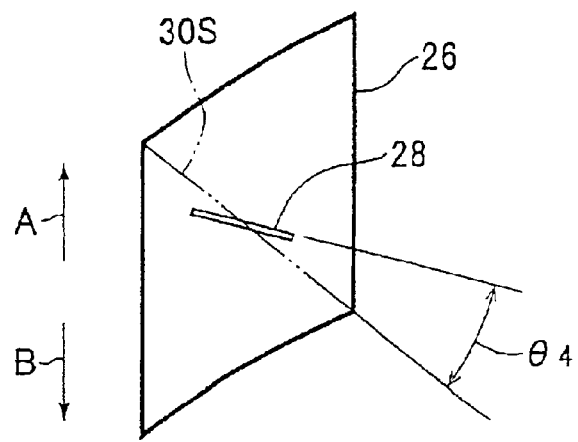
FIG. 2 is an enlarged diagram of a land portion.

As shown in FIG. 2, it is preferred that each auxiliary groove 28 is formed in the central portion of the land portion 26 and substantially along a shorter diagonal line 30S, as indicated by a double-dotted line, and that an angle θ4 formed between the shorter diagonal line 30S and the auxiliary groove 28 is set within ±20 degrees.

In this embodiment, the angle θ4 formed between the shorter diagonal line 30S and the auxiliary groove 28 is 0 degrees, that is, the auxiliary groove 28 is formed on the shorter diagonal line 30S.

It is preferred that the auxiliary groove 28 has a depth of no less than 30% of the depth of the main groove 14, the main groove 16, the main groove 18, the main grooves 20, the main grooves 22 and the main grooves 24.

Figure 3:
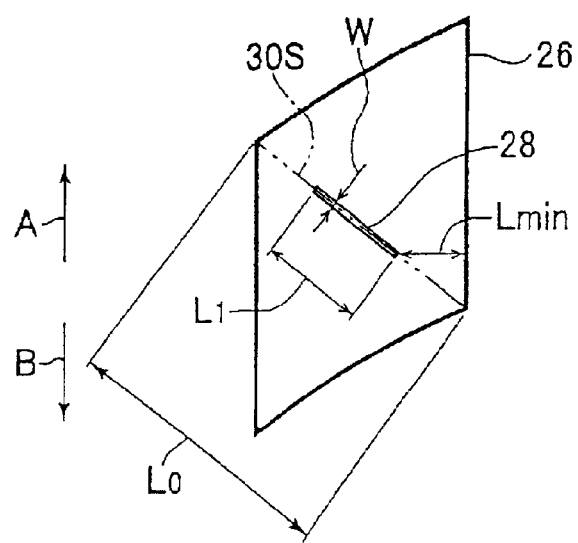
FIG. 3 is an enlarged diagram of a land portion.

Moreover, it is preferred that the auxiliary groove 28 is not opened in any of the main grooves (i.e., the main groove 14, the main groove 16, the main groove 13, the main grooves 20, the main grooves 22 and the main grooves 24), and that the auxiliary groove 28 is provided along the shorter diagonal line 30S and set to have a length L1 equal to or more than 30% and less than 70% of the length L0 of the shorter diagonal line 30S, as shown in FIG. 3.

It is preferred that the shortest distance Lmin between the end portion of the auxiliary groove 28 and the closest main groove is set within the range of 15% or more to less than 35% of the length L0 of the shorter diagonal line 30S.

In this embodiment, the main groove 14, the main groove 16, the main groove 18, the main grooves 20, the main grooves 22 and the main grooves 24 are set to have a depth of 6 mm, and the auxiliary groove 28 is set to have a depth of 4 mm and a length L1 of 47% of the length L0 of the shorter diagonal line 30S.

Here, the shortest distance Lmin between the end portion of the auxiliary groove 28 and the closest main groove is set to 25% of the length L0 of the shorter diagonal line 30S.

It is preferred that the auxiliary groove 28 has a width W of 2 mm or less so as to suppress the decrease in the rigidity of the land portion 26 (the width W may be substantially zero, that is, the auxiliary groove 28 may be the so-called "sipe")

Here, the pneumatic tire 10 of this embodiment has a directional pattern, as shown in FIG. 1, and a size of 215/45R17 and is used as the right front wheel so that it turns in the direction of arrow B when it runs.

(Actions)
(1) The auxiliary groove 28 is formed in the land portion 26, so that the wet performance is improved by the increased edge factor and the water absorption of the auxiliary groove 28.
(2) The auxiliary groove 28 is arranged on the shorter diagonal line 30S of the land portion 26, so that the land portion 26 can be divided into two triangles approximating equilateral triangles to minimize the decrease in rigidity, as caused by forming the auxiliary groove 28, of the land portion 26.

As a result, the deformation of the land portion 26 is suppressed to maintain the dry performance.

Here, the rigidity of the land portion 26 is decreased if the angle θ4 formed between the shorter diagonal line 30S and the auxiliary groove 28 is beyond the range within 20 degrees.

(3) Although the ground contact pressure tends to concentrate at the central portion of the land portion 26 when the land portion 26 contacts the road surface, as the auxiliary groove 28 is formed in the central portion of the land portion 26, the ground contact pressure can be dispersed to the two sides of the auxiliary groove 28 to alleviate the concentrated ground contact pressure at the central portion of the land portion 26.

(4) As the auxiliary groove 28 is not opened to any of the main groove 14, the main groove 16, the main groove 18, the main grooves 20, the main grooves 22 and the main grooves 24, the decrease in the rigidity of the land portion 26 can be more effectively suppressed as compared with the case in which the auxiliary groove 28 are opened to the main grooves.

(5) The depth of the auxiliary groove 28 is about 67% of that of the main groove 14, the main groove 16, the main groove 18, the main grooves 20, the main grooves 22 and the main grooves 24 (the auxiliary groove having the depth of 4 mm and the main groove having the depth of 6 mm), so that the water absorption performance can be maintain until the intermediate stage of wear.

(6) The length L1 of the auxiliary groove 28 is set so as to be 47% of the length L0 of the shorter diagonal line 30S, so that the wet performance and the dry performance are made compatible.

(7) The shortest distance Lmin between the end portion of the auxiliary groove 28 and the main groove the closest to that end portion is set so as to be 25% of the length L0 of the shorter diagonal line 30S, so that the rigidity of the land portion 26 can be maintained.

Here, if the shortest distance Lmin between the end portion of the auxiliary groove 28 and the closest main groove becomes less than 15% of the length L0 of the shorter diagonal line 30S, the end portion of the auxiliary groove 28 comes excessively closer to the main groove so that the rigidity of the land portion 26 is decreased.

Second Embodiment

A second embodiment of the pneumatic tire of the invention will be described with reference to FIG. 4. Here, the same constructions as those of the first embodiment are designated by the common reference numerals, and their description will be omitted.

Figure 4:
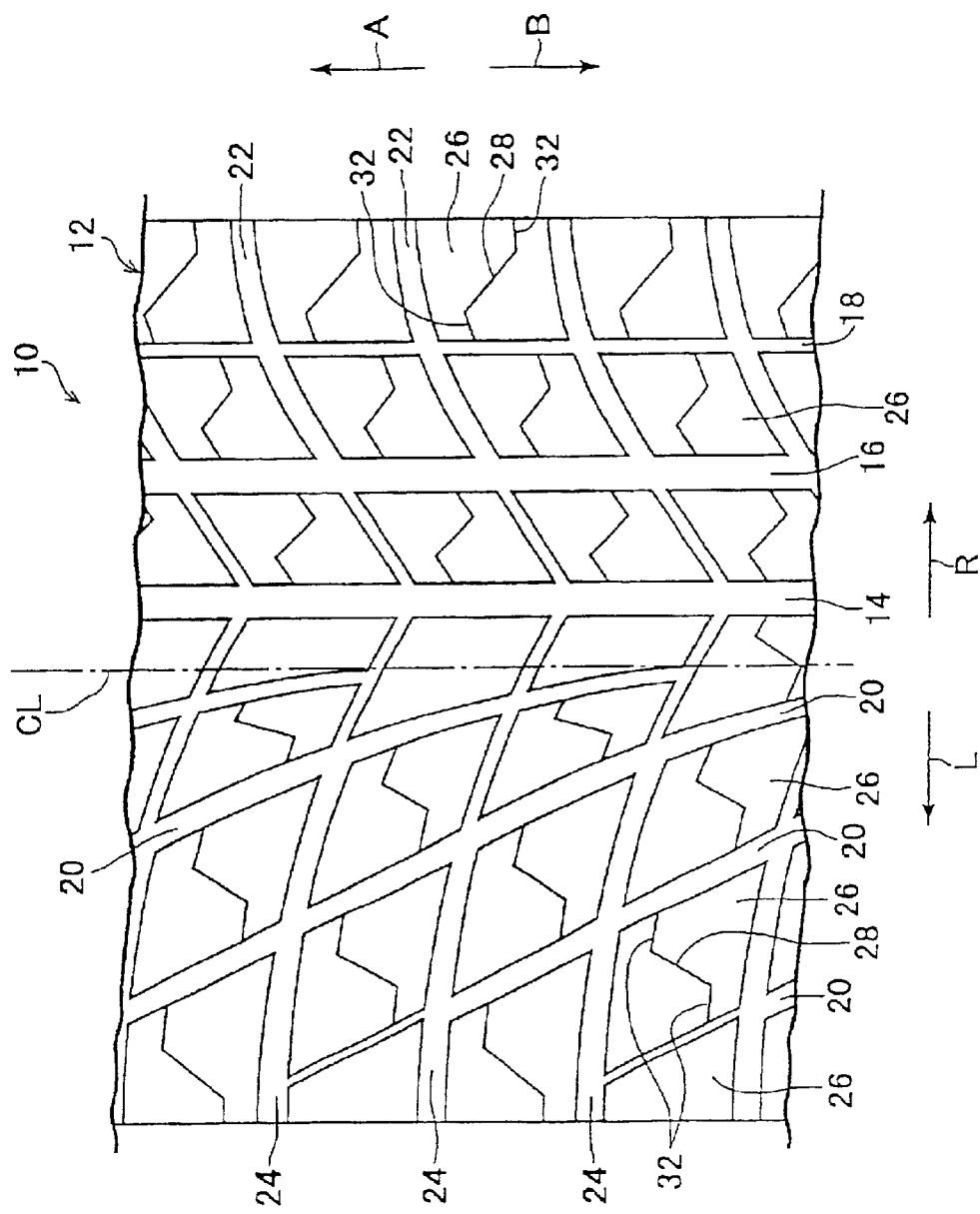
FIG. 4 is a development of the tread of a pneumatic tire according to a second embodiment of the invention.

As shown in FIG. 4, end portion grooves 32 are connected to the two end portions of the auxiliary groove 28, respectively.

The end portion grooves 32 are formed in parallel with the adjacent main grooves 22 or main grooves 24 and opened, at the shortest distances, to the shoulder ends and the main grooves which are the closest to the end portions of the auxiliary grooves 28 (i.e., the main grooves 14, the main grooves 16, the main grooves 18 and the main grooves 20 positioned in the tire width direction in the present embodiment).

The end portion grooves 32 is set to have a depth smaller than that of the auxiliary groove 28.

The end portion grooves 32 of this embodiment are set to have a depth of 2 mm, which is about 33% of the depth of 6 mm of the main groove 14, the main groove 16, the main groove 18, the main grooves 22 and the main grooves 24.

Here, the pneumatic tire 10 of this embodiment has a directional pattern, as shown in FIG. 4, and the size of 215/45R17. The tire is used as the right front wheel so that it turns in the direction of arrow B when it runs.

(Actions)
Further, the angle formed between the end portion groove 32 and the auxiliary groove 28 is made obtuse so that the flow resistance experienced in the grooves can be suppressed to effectively drain the water in the auxiliary groove 28 to the main grooves.

The end portion grooves 32 are arranged substantially in parallel with the neighborhood main grooves to which the end portions grooves 32 are not opened, so that the decrease in rigidity, caused by forming the end portion grooves 32, of the land portion 26 can be most effectively suppressed. The end portion grooves 32 are made shallower than the auxiliary groove 28, so as to have a depth of about 33% of the depth of the main grooves, so that the rigidity of the outer peripheral edge portion of the land portion 26 can be kept in its entirety to maintain the rigidity of the land portion 26 and excellent dry performance.

Here, if the depth of the end portion grooves 32 is less than 10% of the depth of the main grooves, the drainage at the end portion grooves 32 cannot be obtained at the initial stage of wear.

When the end portion grooves 32 disappear due to ware, the tread surface has been roughened so as to have irregularities thereon, so that the sufficient draining effect is obtained by the dented portions formed in the tread surface.

When the depth of the end portion grooves 32 exceeds 30% of the depth of the main grooves, the land portion 26 is deteriorated in its rigidity so that it is susceptible to bending and deteriorates the dry performance.

Here in this embodiment, the two end portion grooves 32 are both opened to the main grooves of the tire axial direction. However, a structure in which at least one of the end portion grooves 32 are opened to the main grooves of the tire circumferential direction is also acceptable.

When the land portion 26 is divided into the two small land portions by the auxiliary groove 28 and the two end portion grooves 32, it is preferred that the end portion grooves 32 are arranged symmetrically with respect to a point, as in this embodiment, to substantially equalize the areas of the two small land portions.

Third Embodiment

A third embodiment of the pneumatic tire of the invention will be described with reference to FIG. 5.

Figure 5:
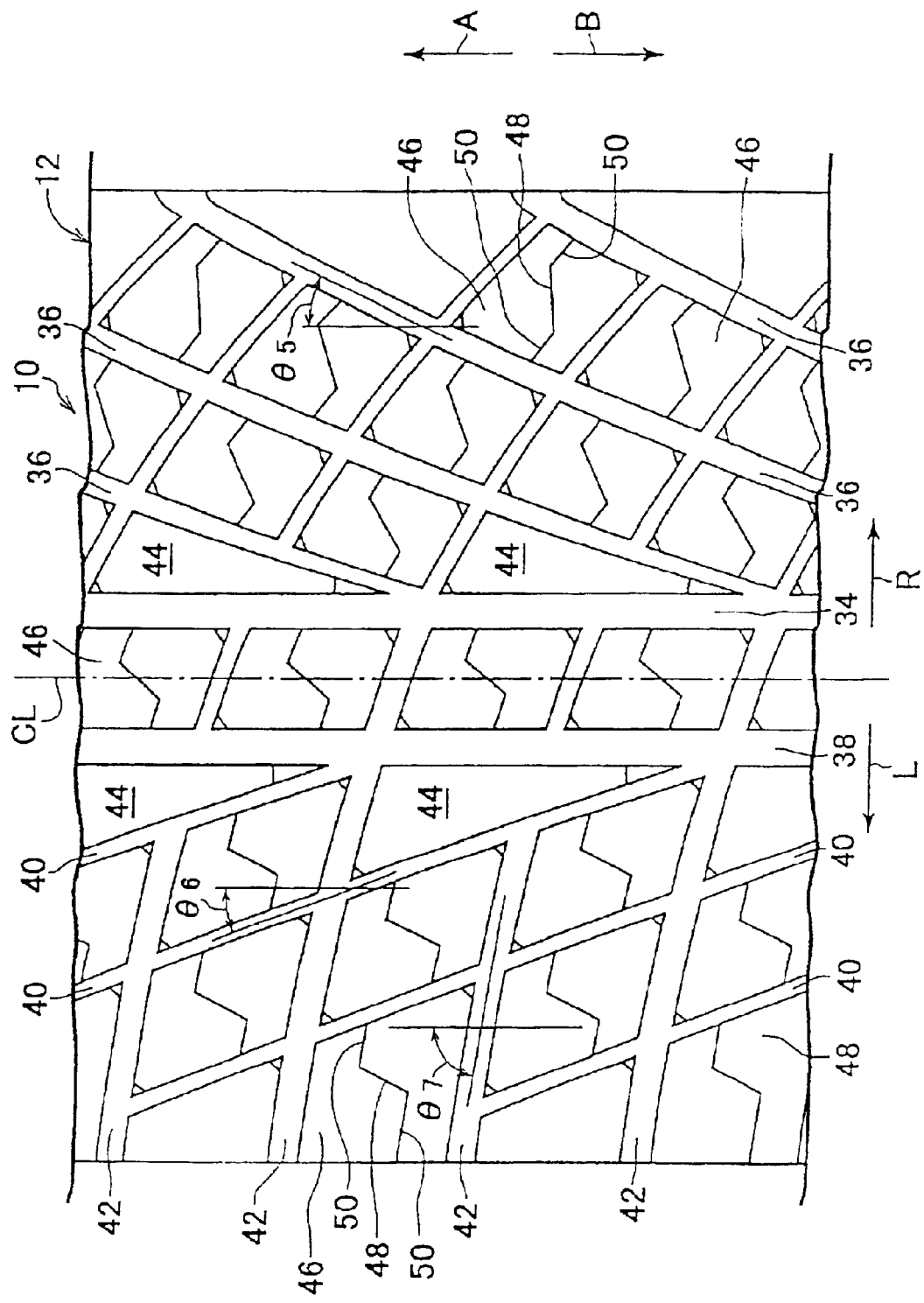
FIG. 5 is a development of the tread of a pneumatic tire according to a third embodiment of the invention.

In the tread 12 of the pneumatic tire 10 of this embodiment, as shown in FIG. 5. there is formed a main groove 34 which is extended, on the righthand side of the tire equatorial plane CL and in the tire circumferential direction. On the righthand side of the main groove 34, there are formed a plurality of main grooves 36 which are inclined at an angle θ5 (e.g., about 25 degrees in this embodiment) with respect to the tire circumferential direction.

In the tread 12, moreover, there are formed a plurality of main grooves 34, main grooves 36, and main grooves 42 which intersect the main groove 38 and main grooves 40.

In the tread 12, there are formed a plurality of triangular land portions 44 and quadrilateral land portions 46 by those main groove 34, main grooves 36, and the main grooves 42 intersecting the main grooves 38 to 40.

Each quadrilateral land portion 46 is a quadrilateral having two diagonal lines of different lengths.

Auxiliary grooves 48 and end portion grooves 50 are formed in most of the plurality of land portions 46 except for some land portions, as in the auxiliary grooves 28 and the end portion grooves 32 of the second embodiment.

Here, the auxiliary grooves 48 and the end portion grooves 50 are specified on their positions and sizes like the auxiliary grooves 28 and the end portion grooves 32 of the first and second embodiments.

Therefore, the pneumatic tire 10 of this embodiment can attain actions and effects similar to those of the first and second embodiments.

Here, the pneumatic tire 10 of this embodiment shown in FIG. 5 has a directional pattern, as in FIG. 4, and the size of 215/45R17. The tire is used as the right front wheel so that it turns in the direction of arrow B when it runs.

(Test Example A)

Therewere prepared tires of totally five different kinds including tires of one kind having no auxiliary groove formed in the land portions and tires of four kinds having auxiliary grooves of different directions, and the tires were compared on the wet performance and the dry performance.

These test tires will be described hereinafter.

All the tires of Test Example 1 to Test Example 5 have the tread pattern shown in FIG. 1.

Tires of Test Example 1: The tires having no auxiliary groove formed in the land portion (as should be referred to the following Table 2).

Tires of Test Example 2: The tires having the auxiliary grooves formed in parallel with the main grooves of the tire circumferential direction (as should be referred to the following Table 2).

Tires of Test Example 3: The tires having the auxiliary grooves formed on the shorter diagonal lines (i.e., the tires of the first embodiment).

Tires of Test Example 4: The tires having the auxiliary grooves formed on the longer diagonal lines (as should be referred to the following Table 2).

Tires of Test Example 5: The tires having the auxiliary grooves formed in parallel with the main grooves of the tire axial direction (as should be referred to the following Table 2).

Here in all these Tires: the main grooves have a depth of 6 mm; the auxiliary grooves have a length of 47% of the length of the shorter diagonal lines (wherein the shortest distance between the end portion of the auxiliary groove and the closest main groove is 21% of the length of the shorter diagonal line); and the auxiliary grooves have a depth of 4 mm.

Here will be described the testing method.

Wet Performance: A car having the test tires was driven at a test course (having a wet road surface). The evaluations were made in terms of the feelings of the test driver.

Dry Performance: A car having the test tires was driven at a test course (having a dry road surface). The evaluations were made in terms of the feelings of the test driver.

The evaluations are enumerated in the following Table 2. Here, the evaluations were made according to the standards, as enumerated in the following Table 1.

TABLE 1

| Points | |
|---|---|
| +5 | Very Good |
| +4 | Rather Good |
| +3 | Good |
| +2 | Slightly Good |
| | (Evaluable for Ordinary Driver) |
| +1 | Very slightly Good |
| | (Evaluable for Test Driver) |
| 0 | Standard |
| | (by Tires with No Auxiliary Groove in Land Portions) |
| −1 | Very slightly Bad |
| | (Evaluable for Test Driver) |
| −2 | Slightly Bad |
| | (Evaluable for Ordinary Driver) |
| −3 | Bad |
| −4 | Rather Bad |
| −5 | Very Bad |

TABLE 2

|  | Test Example 1 | Test Example 2 | Test Example 3 | Test Example 4 | Test Example 5 |
|---|---|---|---|---|---|
| Shape | ▱ | ▱ | ▱ | ▱ | ▱ |
| Wet Perf. | 0 | +1 | +2 | 0 | +1 |
| Dry Perf. | 0 | −1 | 0 | −3 | −2 |

In Table 2, Perf.: Performance.

It has been found from the test results that Tires of Test Example 3 according to the invention exhibit a dry performance equivalent to that of Tire of Test Example 1 having no auxiliary groove and have the best wet performance.

(Test Example B)

There were prepared tires of totally five different kinds including: tires of one kind having no auxiliary groove and no end portion groove formed in the land portions; tires of one kind having only auxiliary grooves formed therein; and tires of three kinds having auxiliary grooves and end portion grooves of different depths, and the tires were compared on the wet performance and the dry performance.

Here will be described the test tires.

All the tires of Test Example 1 to Test Example 5 have the tread pattern shown in FIG. 4.

Tires of Test Example 1: The tires having no auxiliary groove formed in the land portion (as should be referred to the following Table 3).

Tires of Test Example 2: The tires having the auxiliary grooves of a depth of 4 mm formed in parallel with the main grooves of the tire circumferential direction (as should be referred to the following Table 3).

Tires of Test Example 3: The tires having end portion grooves of a depth of 4 mm formed on the two end portions of auxiliary grooves of a depth of 4 mm (as should be referred to the following Table 3).

Tires of Test Example 4: The tires having end portion grooves of a depth of 2 mm formed at the two end portions of auxiliary grooves of a depth of 4 mm (as should be referred to the following Table 3).

Tires of Test Example 5: The tires having end portion grooves of a depth of 2 mm formed on the two end portions of auxiliary grooves of a depth of 2 mm (as should be referred to the following Table 3).

Here in all these Tires, the main grooves have a depth of 6 mm, and the auxiliary grooves have a length of 47% of the length of the shorter diagonal line.

The testing method and the evaluation standards of the wet performance and the dry performance are similar to those of Test Example 1.

The evaluations are enumerated in the following Table 3, which also includes the result of lap times at the tests.

TABLE 3

|  | Test Example 1 | Test Example 2 | Test Example 3 | Test Example 4 | Test Example 5 |
|---|---|---|---|---|---|
| Shape | ▱ | ▱ | ▱ | ▱ | ▱ |
| WP | 0 | +2 | +3 | +5 | +4 |
| LT | 70.5 | 69.7 | 68.9 | 68.2 | 68.5 |
| DP | 0 | −1 | −3 | −1 | 0 |

TABLE 3-continued

|  | Test Example 1 | Test Example 2 | Test Example 3 | Test Example 4 | Test Example 5 |
|---|---|---|---|---|---|
| LT | 60 | 60.7 | 62.3 | 60.8 | 60.2 |

In Table 3,
WP: Wet Performance
LT: Lap Time (secs.)
DP: Dry Performance.

From the test results, it has been found on the wet performance that the wet performance was improved better for the tires of Test Examples 3 to 5 having the end portion grooves added than for the tires of Test Example 2 having only the auxiliary grooves. However, the tires of Test Example 3 having the end portion grooves made as deep as the auxiliary grooves exhibited deteriorated rigidity in the land portion, to significantly decrease the dry performance.

(Test C)

There were prepared tires of one kind having no auxiliary groove and no end portion groove formed in the land portions, and tires of two kinds having auxiliary grooves formed therein and having end portion grooves of different positions. These tires were compared on the wet performance and the dry performance.

The tires of Test Example 1 to Test Example 3 have the tread pattern shown in FIG. 4.

Tires of Test Example 1: The tires having no auxiliary groove formed in the land portion (as should be referred to the following Table 4).

Tires of Test Example 2: The tires having the end portion grooves formed in parallel with the main grooves positioned in the tire circumferential direction (as should be referred to the following Table 4).

Tires of Test Example 3: The tires having one of the end portion grooves formed in parallel with the main grooves positioned in the tire axial direction (as should be referred to the following Table 4).

Here in all these Tires: the main grooves have a depth of 6 mm; the auxliary grooves have a length of 47% of the length of the shorter diagonal line; and the end portion grooves have a depth of 2 mm.

The testing method and the evaluation standards of the wet performance and the dry performance are similar to those of Test Example 2.

The evaluation are enumerated in the following Table 4, which also includes the results of lap times at the tests.

TABLE 4

|  | Test Example 1 | Test Example 2 | Test Example 3 |
|---|---|---|---|
| Shape | ▱ | ▱ | ▱ |
| WP | 0 | +4 | +3 |
| LT | 70.5 | 68.5 | 68.7 |
| DP | 0 | 0 | 0 |
| LT | 60 | 60.2 | 60.3 |

In Table 4,
WP: Wet Performance
LT: Lap Time (sec.)
DP: Dry Performance.

It has been found from the test results that the wet performance is more excellent for the tires having the end portion grooves formed in parallel with the main grooves adjacent in the tire circumferential direction than for the tires having one of the end portion grooves formed in parallel with the main grooves adjacent in the tire axial direction, and that the dry performance is made compatible with the wet performance in the former case.

(Test Example D)

There were prepared tires of five different kinds each having end portion grooves in different directions, and the tires were compared on the durability of the land portions.

Here will be described the test tires.

All the tires of Test Example 1 to Test Example 5 have the tread pattern shown in FIG. 1, but have the auxiliary grooves and the end portion grooves formed in only the second-row land portions counted from the right end.

Tires of Test Example 1: The tires in which the angle of the end portion grooves with respect to the main grooves adjacent in the tire circumferential direction is −30 degrees (as should be referred to the following Table 5). Here, the symbol "−(minus)" of the angle means that the end portion grooves are inclined in such a direction that the openings thereof to the main grooves approach the main grooves adjacent in the tire circumferential direction.

Tires of Test Example 2: The tires in which the end portion grooves have an angle (as described above) of −15 degrees (as should be referred to the following Table 5).

Tires of Test Example 3: The tires in which the end portion grooves have an angle (as described above) of 0 degrees (as should be referred to the following Table 5).

Tires of Test Example 4: The tires in which the end portion grooves have an angle (as described above) of +15 degrees (as should be referred to the following Table 5).

Tires of Test Example 5: The tires in which the end portion grooves have an angle (as described above) of +30 degrees (as should be referred to the following Table 5).

Here, the land portion having the auxiliary groove and the end portion grooves has sizes, as shown in FIG. 6. In all these Tires, the main grooves have a depth of 6 mm, and the auxiliary grooves have a length of 50% of the length of the shorter diagonal lines and a depth of 2 mm.

Here will be described the testing method.

The tests were conducted by driving a car having the test tires attached thereon on a test course (one lap took 60 seconds) fifteen laps.

Here, the results were evaluated by assigning "O" for the tires having no peel generated on the tread (here, "the tread" means the opening portions of the end portion grooves where the end portion grooves are open to the main groove sides, as indicated by arrows in the Table) after 15 laps and by assigning "X" the tires having a peel generated thereon after 15 laps.

The results are enumerated by the following Table 5.

TABLE 5

|  | Test Example 1 | Test Example 2 | Test Example 3 | Test Example 4 | Test Example 5 |
|---|---|---|---|---|---|
| Shape | | | | | |
| Peel | X | O | O | O | X |

It has been found that, when the angle of the end portion grooves was within ±15 degrees, the test results were good.

(Test Example E)

There were prepared tires of totally five different kinds including tires of one kind having no auxiliary groove formed in the land portions and tires of four kinds having auxiliary grooves formed in the land portions and each having different lengths of the auxiliary grooves. The tires were compared on the wet performance and the dry performance.

Here will be described the test tires.

All the tires of Test Example 1 to Test Example 5 have the tread pattern shown in FIG. 4.

The tires of Test Example 1 have no auxiliary groove formed in the land portions, and all the tires of Test Example 2 to Test Example 5 have the auxiliary grooves formed in the individual land portions but these example tires each have different lengths of the auxiliary grooves (as should be referred to the following Table 6).

In all the tires, the main grooves have a depth of 6 mm, and the auxiliary grooves have a depth of 4 mm. The lengths of the auxiliary grooves, as enumerated in the Table, are exponentially expressed by setting, as the reference value, the length of the auxiliary grooves taken across the land portions along the shorter diagonal lines as 100.

Here, the testing methods are similar to those of Test

TABLE 6

|  | Test Example 1 | Test Example 2 | Test Example 3 | Test Example 4 | Test Example 5 | Test Example 6 |
|---|---|---|---|---|---|---|
| Shape | | | | | | |
| Length of Aux.Grvs. | 0 | 20 | 40 | 60 | 80 | 100 |
| Wet Perf. | 0 | 0 | +2 | +2.5 | +1.5 | +1 |
| Dry Perf. | 0 | 0 | −1 | −2 | −3 | −4 |

In Table 6,
Perf.: Performance
Aux.Grvs.: Auxiliary Grooves.

The evaluation result of "−3" or lower is regarded as "not suitable" for the lengths of the auxiliary grooves here, and it has been found from the test results that the range of 30% (between 20% and 40%) to 70% (or less than 80%) is good with respect the compatibility of the wet performance with the dry performance.

Fourth Embodiment

A fourth embodiment of the pneumatic tire of the invention will be described with reference to FIGS. 7 and 8.

Figure 7:
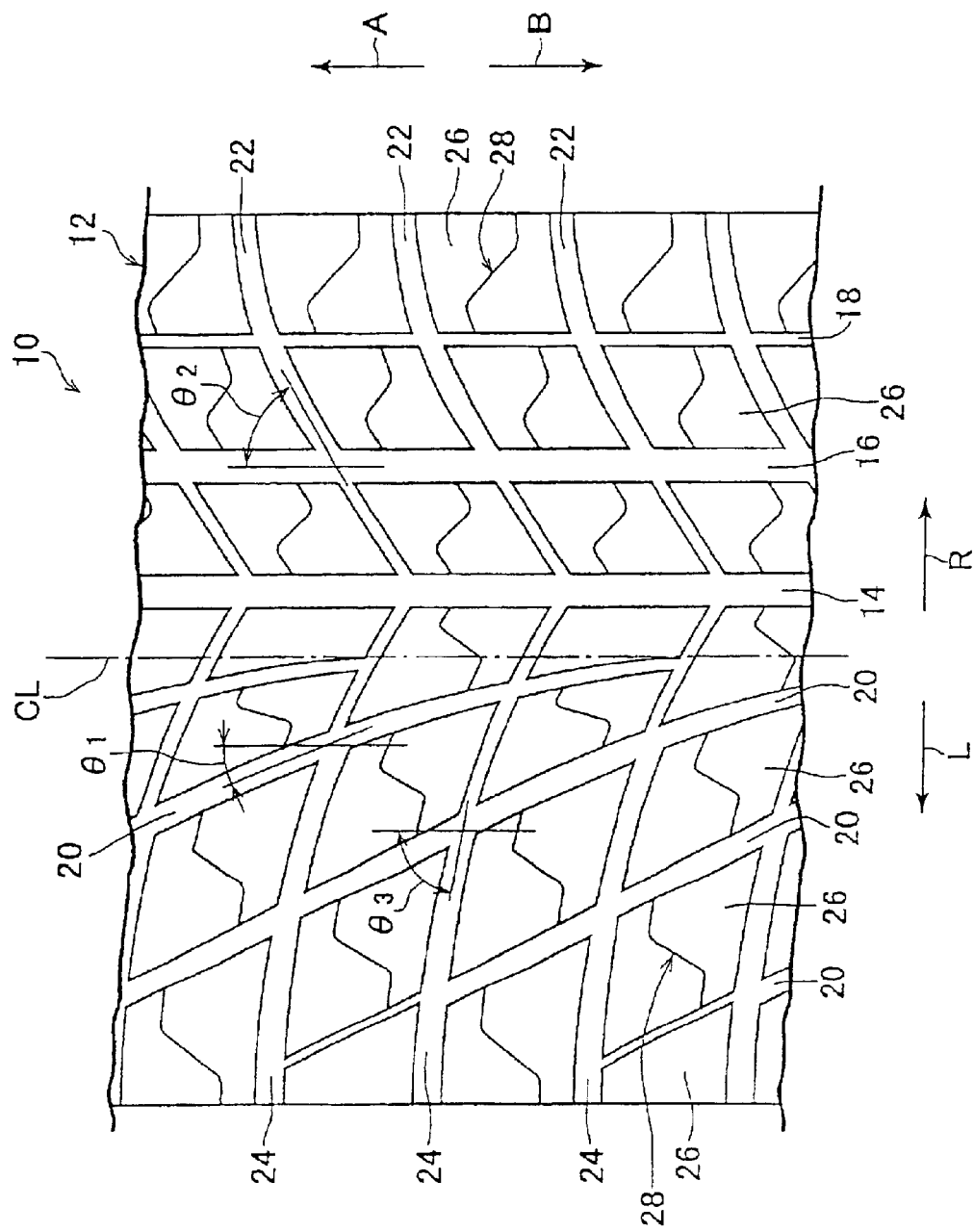
FIG. 7 is a development of the tread of a pneumatic tire according to a fourth embodiment of the invention.

In the tread 12 of a pneumatic tire 10 of this embodiment, as shown in FIG. 7, there are formed, on the righthand side (as indicated by arrow R) of a tire equatorial plane CL, a main groove 14, a main groove 16 and a main groove 18 which extend in the tire circumferential directions (as indicated by arrow A and by arrow B). On the lefthand side of the tire equatorial plane CL (as indicated by arrow L), there are formed a plurality of main grooves 20 which are inclined at an angle no more than 30 degrees with respect to the tire circumferential direction.

An angle θ1 of the main grooves 20 of this embodiment with respect to the tire circumferential direction (which is measured on the acute angle side, and is an angle formed between the circumferential direction and the tangential line of the groove center line, if curved) is set so as to be larger on the lefthand shoulder side than on the tire equatorial plane CL side, such that the angle θ1 is about 5 degrees with respect to the tire circumferential direction at the end portion of the main groove 20 on the tire equatorial plane CL side and about 28 degrees with respect to the tire circumferential direction at the end portion of the main groove 20 on the shoulder side.

In the tread 12, moreover, there are formed, on the righthand side of the tire equatorial plane CL, a plurality of main grooves 22 which intersect the main grooves 14, the main groove 16 and the main groove 18. On the lefthand side, there are formed a plurality of main grooves 24 which intersect the main grooves 20.

An angle θ2 of the main grooves 22 of this embodiment with respect to the tire circumferential direction (which is measured on the acute angle side, and is an angle formed between the circumferential direction and the tangential line of the groove center line, if curved) is set so as to be larger on the righthand shoulder side than on the tire equatorial plane CL side, such that the angle θ2 is about 60 degrees with respect to the tire circumferential direction at the end portion of the main groove 22 on the tire equatorial plane CL side and about 78 degrees with respect to the tire circumferential direction at the end portion of the main groove 22 on the shoulder side.

In addition, an angle θ3 of the main grooves 24 of this embodiment with respect to the tire circumferential direction (which is measured on the acute angle side, and is an angle formed between the circumferential direction and the tangential line of the groove center line, if curved) is set so as to be larger on the lefthand shoulder side than on the tire equatorial plane CL side, such that the angle θ3 is about 60 degrees with respect to the tire circumferential direction at the end portion of the main grooves 24 on the tire equatorial plane CL side and about 88 degrees with respect to the tire circumferential direction at the end portion of the main groove 24 on the shoulder side.

In this embodiment, all of these main groove 14, main groove 16, main groove 18, main grooves 20, main grooves 22 and main grooves 24 are given an equal depth.

On the tread 12, there are formed a plurality of quadrilateral land portions 26 by those main groove 14, main groove 16, main groove 18, main grooves 20, main grooves 22 and main grooves 24.

The individual land portions 26 are formed into quadrilateral shapes having two diagonal lines of different lengths.

Auxiliary grooves 28 are formed in most of the plurality of land portions 26 expect for some land portions.

Here will be specified the auxiliary grooves 28. The land portions 26 represented by the third one counted from the righthand side end will be described hereinafter with reference to FIG. 8. Here, the common specifications will be adopted for the auxiliary grooves 28 of the remaining land portions 26.

Figure 8:
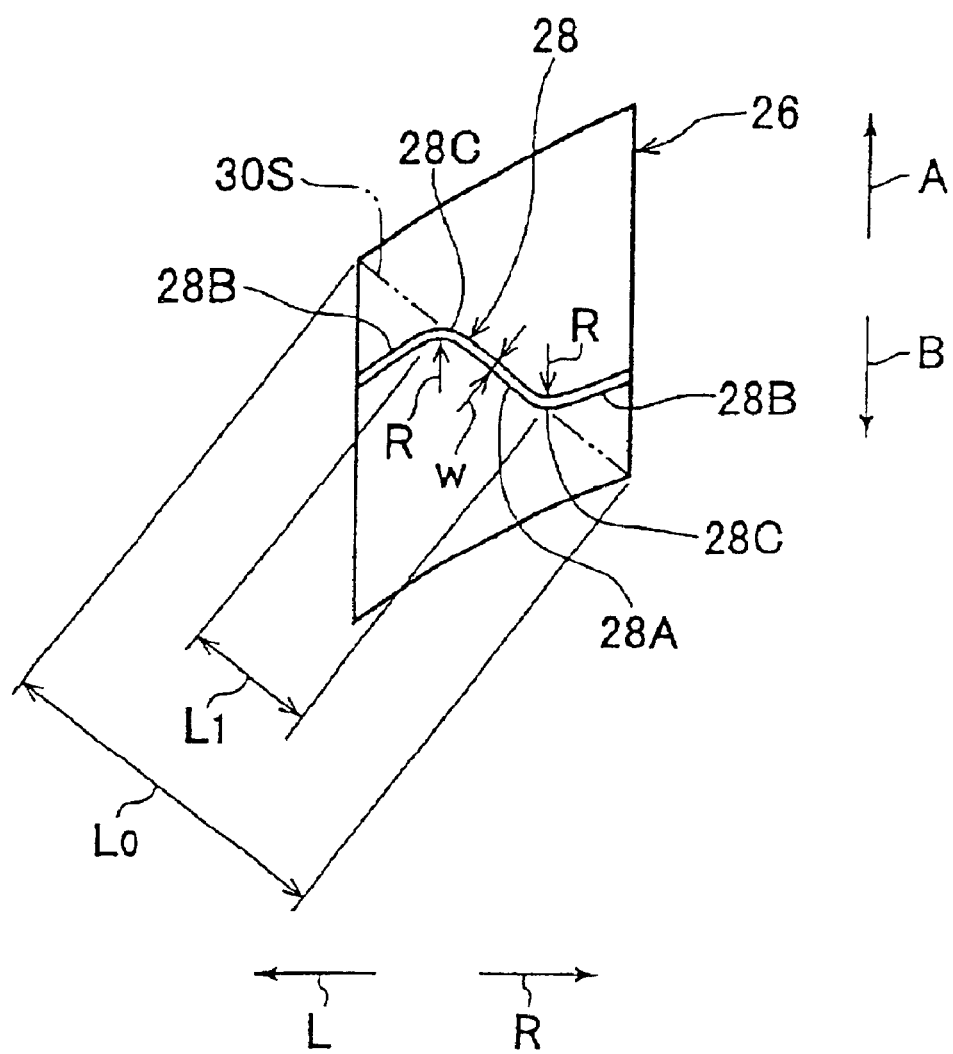
FIG. 8 is an enlarged diagram of a land portion.

As shown in FIG. 8, the auxiliary groove 28 is formed of: a central auxiliary groove portion 28A arranged at the central portion of the land portion 26; end portion auxiliary groove portions 28B opened to the main grooves closest to the end portions of the central auxiliary groove portion 28A; and arcuate connecting portions 28C connecting the central auxiliary groove portion 28A and the end portion auxiliary groove portions 28B.

In order to reduce the flow resistance of water, it is preferred that the connecting portions 28C have a radius of curvature of no less than 3 mm and no more than 10 mm.

It is preferred that the central auxiliary groove portion 28A is formed in the central portion of the land portion 26 and substantially along a shorter diagonal line 30S, as indicated by a double-dotted line, and that the angle formed between the shorter diagonal line 30S and the central auxiliary groove portion 28A is within ±20 degrees. In this embodiment, the angle between the shorter diagonal line 30S and the central auxiliary groove portion 28A is 0 degrees, that is, the central auxiliary groove portion 28A is formed on the shorter diagonal line 30S.

It is preferred that the central auxiliary groove portion 28A has a depth of no less than 30% of the depth of the main groove 14, the main groove 16, the main groove 18, the main grooves 20, the main grooves 22 and the main grooves 24.

It is further preferred that the length L1 (i.e., the distance between intersections of the extension of the central auxiliary groove portion 28A with the extension of the end portion auxiliary groove portions 28B) of the central auxiliary groove portion 28A is set so as to be no more than 30% and less than 70% of the length L0 of the shorter diagonal line 30S.

In this embodiment: the main groove 14, the main groove 16, the main groove 18, the main grooves 20, the main grooves 22 and the main grooves 24 are set so as to have a depth of 6 mm; the central auxiliary groove portion 28A is set so as to have a depth of 2 mm and a length L1 which is about 47% of the length L0 of the shorter diagonal line 30S; and the end portion auxiliary groove portions 28B are set so as to have a depth of 2 mm.

Further, it is preferred that the auxiliary groove 28 has a width W of 2 mm or less so as to suppress the decrease in the rigidity of the land portion 26 (or the width W may be substantially zero, that is, the auxiliary groove 28 may be the so-called "sipe").

As shown in FIG. 7, the pneumatic tire 10 of this embodiment has a directional pattern and a size of 215/45R17. The tire is used as the right front wheel so that it turns in the direction of arrow B when it runs. Here, the pneumatic tire to be used as the left front tire has a pattern symmetric to that of FIG. 7.

(Actions)

(1) The auxiliary groove 28 is formed across in the land portion 26 so that the wet performance is improved by the increased edge factor and the good water absorption and drainage achieved by the auxiliary groove 28. Here, the water which has been absorbed by the auxiliary groove 28 is drained through the end portion auxiliary groove portions 28B to the main grooves.

Moreover, the end portion auxiliary groove portions 28B are opened, at the shortest distance, into the main grooves which is the closest to the end portions of the auxiliary grooves 28 so that the length of the end portion auxiliary groove portions can be shortened as much as possible. Further, as the connecting portions 28C are formed into the arcuate shape, the absorbed water can be efficiently drained into the main grooves.

Here, when the radius of curvature of the connection portions 28C is less than 3 mm, the concentration of stress in the vicinity of the connection portions 28C cannot be alleviated, thereby to facilitate occurrence of cracks. In addition, the distribution of stress becomes uneven in the vicinity of the connection portions 28C, so that the heel-and-toe wear is likely to occur. Moreover, the flow resistance rises at the connection portions 28C to deteriorate the drainage.

(2) The central auxiliary groove portion 28A is arranged on the shorter diagonal line 30S of the land portion 26 so that the land portion 26 can be divided into two triangles approximating equilateral triangles, to prevent the land portion 26 from becoming weak in a specific direction and to minimize the decrease in the rigidity of the land portion 26. As a result, the deformation of the land portion 26 is suppressed to maintain excellent dry performance.

Here, the rigidity of the land portion 26 is decreased if the angle $\theta 3$ formed between the shorter diagonal line 30S and the central auxiliary groove portion 28A is beyond the range within ±20 degrees.

When the radius of curvature of the connection portions 28C exceeds 10 mm, the length of the central auxiliary groove portion 28A is reduced so much that it cannot exhibit its intrinsic function (i.e., the function to divide the land portion 26 into the two triangles approximating equilateral triangles to prevent the land portion 26 from becoming weak in a specific direction).

(3) Although the ground contact pressure tends to concentrate at the central portion of the land portion 26 when the land portion 26 contacts the road surface, as the central auxiliary groove portion 28A is formed in the central portion of the land portion 26, the ground contact pressure can be dispersed to the two sides of the auxiliary groove 28 to alleviate the concentrated ground contact pressure at the central portion of the land portion 26.

(4) The depth of the central auxiliary groove portion 28A is about 33% of that of the main groove 14, the main groove 16, the main groove 18, the main grooves 20, the main grooves 22 and the main grooves 24 (the central auxiliary groove portion 28A has the depth of 2 mm and the main groove has the depth of 6 mm), so that sufficient drainage of the land portion 26 can be maintained.

(5) The length L1 of the central auxiliary groove portion 28A is set so as to be 47% of the length L0 of the shorter diagonal line 30S, so that the wet performance and the dry performance are made compatible.

Here, when the length L1 of the central auxiliary groove portion 28A exceeds 70% of the length L0 of the shorter diagonal line 30S, the rigidity of the land portion 26 decrease, to deteriorate the dry performance.

(6) The end portion auxiliary groove portions 28B are set so as to have a depth equivalent to that of the central auxiliary groove portion 28A, and the end portion auxiliary groove portions 28B are set so as to have a depth of about 33% of the depth of the main grooves, so that the rigidity of the outer peripheral edge portion of the land portion 26 can be maintained in its entirety, whereby the rigidity of the land portion 26 and the dry performance are both sufficiently maintained.

When the depth of the end portion auxiliary groove portions 28B exceeds 30% of the depth of the main grooves, the land portion 26 is deteriorated in its rigidity so that it is susceptible to bending deformation and the dry performance deteriorates.

Here in this embodiment, the two end portion auxiliary groove portions 28B are both opened to the main grooves of the tire axial direction. However, a structure in which at least one of the end portion auxiliary groove portions are opened to the main grooves of the tire circumferential direction is also acceptable.

When the land portion 26 is divided into the two small land portions by the central auxiliary groove portion 28A, the two end portion auxiliary groove portions 28B and the connection portions 28C, it is preferred that the paired end portion auxiliary groove portions 28B are arranged symmetrically with respect to a point, as in this embodiment, to substantially equalize the areas of the two small land portions.

Fifth Embodiment

A fifth embodiment of the pneumatic tire of the invention will be described with reference to FIG. 9.

A pneumatic tire 50 of this fifth embodiment is the tire for a left rear wheel, as used in pair with the pneumatic tire 10 (for the front wheel) of the fourth embodiment Here, the pneumatic tire to be used for the right rear wheel has a pattern symmetric to that of FIG. 9.

Here, for the same constructions as those of the fourth embodiment, the description thereof will be omitted by designating the common numerals thereto. In addition, the pneumatic tire 50 of this embodiment has a size of 245/45R17.

In the tread 12 of the pneumatic tire 50 of this embodiment, as shown in FIG. 9, there are formed on the lefthand side (as indicated by arrow L) main grooves 32, 34, 36, 38, 40 and 42 which extend in the tire circumferential directions (as indicated by arrow A and by arrow B). On the righthand side (as indicated by arrow R), there are formed a plurality of main grooves 44 which are inclined at an angle no more than 40 degrees with respect to the tire circumferential direction.

An angle $\theta 1$ of the main grooves 44 of this embodiment formed with respect to the tire circumferential direction (which is measured on the acute angle side, and is an angle formed between the circumferential direction and the tangential line of the groove center line, if curved) is set so as to be larger on the righthand shoulder side than on the side of the tire equatorial plane CL, such that the angle is about 5 degrees with respect to the tire circumferential direction at the end portion on the side of the tire equatorial plane CL and about 32 degrees with respect to the tire circumferential direction at the end portion on the shoulder side.

In the tread 12, moreover, there are formed on the lefthand side a plurality of main grooves 46 which extend from the lefthand shoulder side toward the main groove 38 and intersect the main grooves 32, 34 and 36. On the righthand side there are formed a plurality of main grooves 48 which extend from the righthand shoulder side toward the main groove 38 and intersect the grooves 40, 42 and 44.

An angle $\theta 2$ of the main grooves 46 of this embodiment formed with respect to the tire circumferential direction (which is measured on the acute angle side, and is an angle formed between the circumferential direction and the tangential line of the groove center line, if curved) is set so as to be larger on the lefthand shoulder side, such that the angle is about 55 degrees with respect to the tire circumferential direction at the end portion on the side of the tire equatorial plane CL and about 90 degrees with respect to the tire circumferential direction at the end portion on the shoulder side.

An angle $\theta 3$ of the main grooves 48 of this embodiment formed with respect to the tire circumferential direction (which is measured on the acute angle side, and is an angle formed between the circumferential direction and the tangential line of the groove center line, if curved) is set so as to be larger on the righthand shoulder side, such that the angle is about 55 degrees with respect to the tire circumferential direction at the end portion on the side of the tire equatorial plane CL and about 88 degrees with respect to the tire circumferential direction at the end portion on the shoulder side.

In this embodiment, all of these main grooves 32, 34, 36, 38, 40, 42, 44, 46 and 48 are given an equal depth.

On the tread 12, there are formed a plurality of quadrilateral land portions 52 by those main grooves 32, 34, 36, 38, 40, 42, 44, 46 and 48. In these land portions 52, there are formed the auxiliary grooves 28 which are specified as in the fourth embodiment.

In the pneumatic tire 50 of this embodiment, therefore, there are obtained actions and effect similar to those of the pneumatic tire 10 of the fourth embodiment.

Sixth Embodiment

Figure 10A:
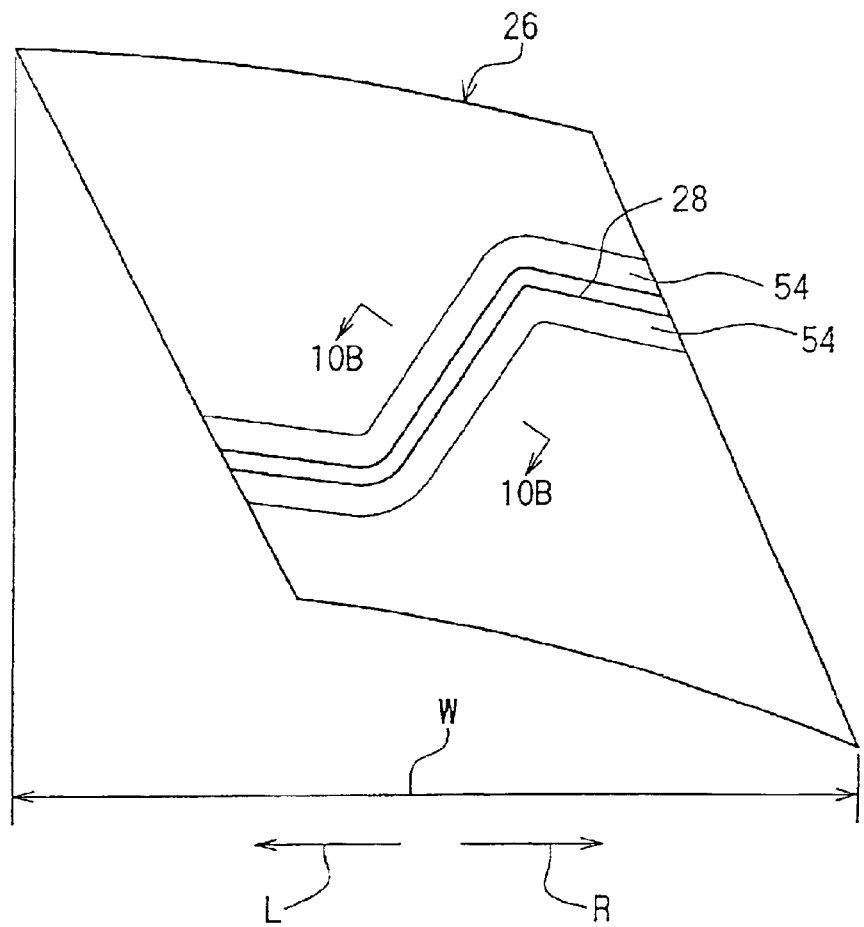
FIG. 10A is a top plan view of the land portion of a pneumatic tire according to a sixth embodiment of the invention.
Figure 10B:
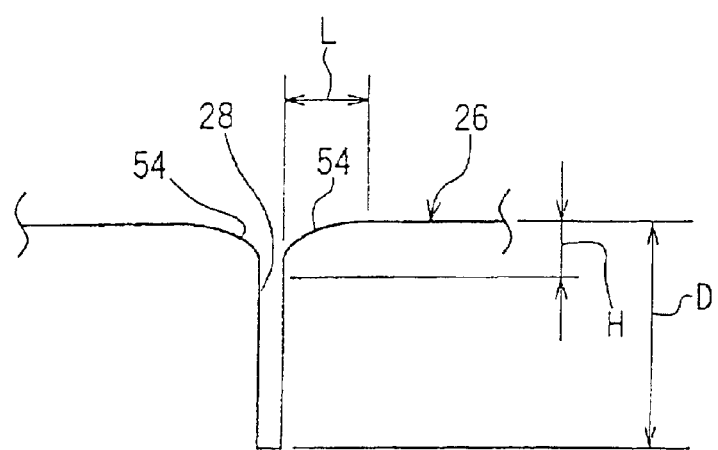
FIG. 10B is a sectional diagram of the land portion shown in FIG. 10A, taken along line 10B—10B.

A sixth embodiment of the pneumatic tire of the invention will be described with reference to FIGS. 10A and 10B. As shown in FIGS. 10A and 10B, chamfered portions 54 are formed at the two corner portions of the auxiliary groove 28 of the land portion 26.

The chamfered portions 54 are formed throughout the length of the auxiliary groove 28.

It is preferred that the chamfered portions 54 have a gently bulging shape (e.g., an arcuate shape having a single radius of curvature, a shape formed by combining a plurality of arcs of different curvatures), when viewed in a section normal to the longitudinal direction of the auxiliary groove 28, as shown in FIG. 10B.

The maximum value of the depth H of the chamfered portions 54 is preferably within the range of no less than 5% to no more than 50% of the groove depth D of the auxiliary groove 28 and is more preferably within the range of no less than 10% to no more than 30%.

The effect of reducing the change in the ground contact pressure under the influence of the lateral and longitudinal forces is decreased, if the maximum of the depth H of the chamfered portions 54 is less than 5% of the groove depth D. On the other hand the ground contact area is reduced too much if the depth maximum is more than 50% of the groove depth D.

The maximum value of the length L of the chamfered portions 54, as measured in parallel with the ground contact face in a section normal to the longitudinal direction of the auxiliary groove 28, is preferably within the range of no less 5% to no more than 50% of the maximum width W of the land portion 26 in the tire axial direction, and is more preferably within the range of no less than 10% to no more than 30%.

The ground contact area is reduced too much, if the maximum of the length L of the chamfered portions 54 exceeds 50% of the maximum width W of the land portion 26 in the tire axial direction. On the other hand, the effect to reduce the change in the ground contact pressure under the influence of the lateral and longitudinal forces is decreased if the maximum length is less than 5%.

It is preferred that the depth H of the chamfered portions 54 is larger, at the ends and the central portion of the land portion in the auxiliary groove 28, than at the remaining portions of the auxiliary groove 28. Without the chamfered portions 54 at the land portion ends and the central portion of the auxiliary groove 28, the contact pressure is seriously raised at the land portion 26. Accordingly, by making the depth H larger than that of the remaining portions, the ground contact pressure is effectively made even.

The distribution of the ground contact pressure in the land portion 26 while the lateral force is acting thereon varies according to the shape of the land portion 26 or the route of the auxiliary groove 28. By mildly changing the depth H of the chamfered portions 54 of the auxiliary groove 28 at the individual points in the longitudinal direction, however, the distribution of the ground contact pressure can be effectively made even, whereby and the resistance against partial wear, the wear performance and the running performance are also improved.

(Test Example F)

There were prepared tires of two kinds for the test examples. These tires were attached by a car, and this car was run on the test course having a dry road surface to measure the best lap time and an average lap time (for ten laps). At the same time, the partial wear (i.e., the heel-and-toe) and the state of generation of cracks were observed after a run of a predetermined distance. Moreover, there was also examined the grip-maintaining property at the time of running.

Figure 12:
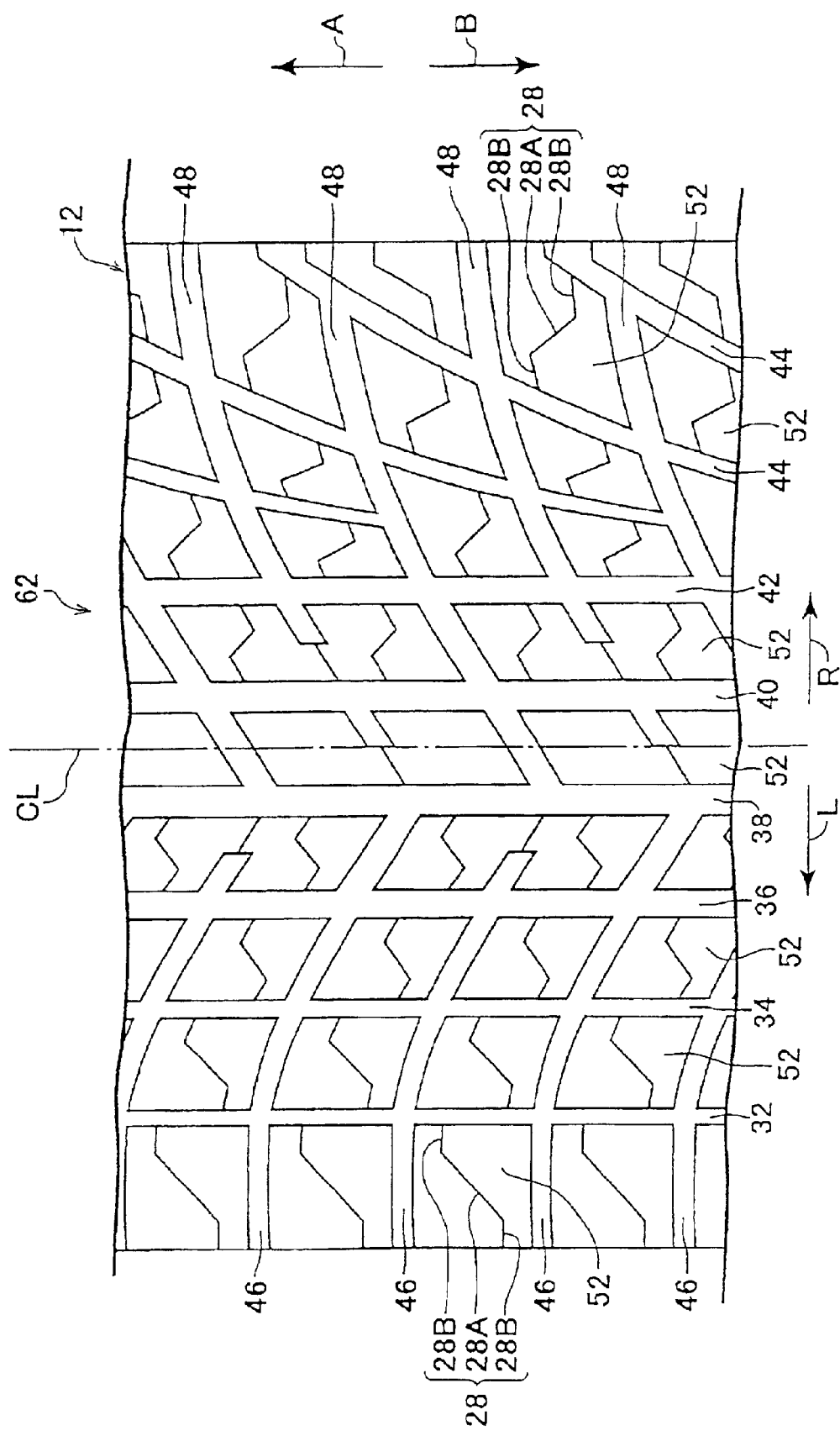
FIG. 12 is a development of the tread of a pneumatic tire for a rear wheel according to Example (of Test Example F).
Figure 13A:
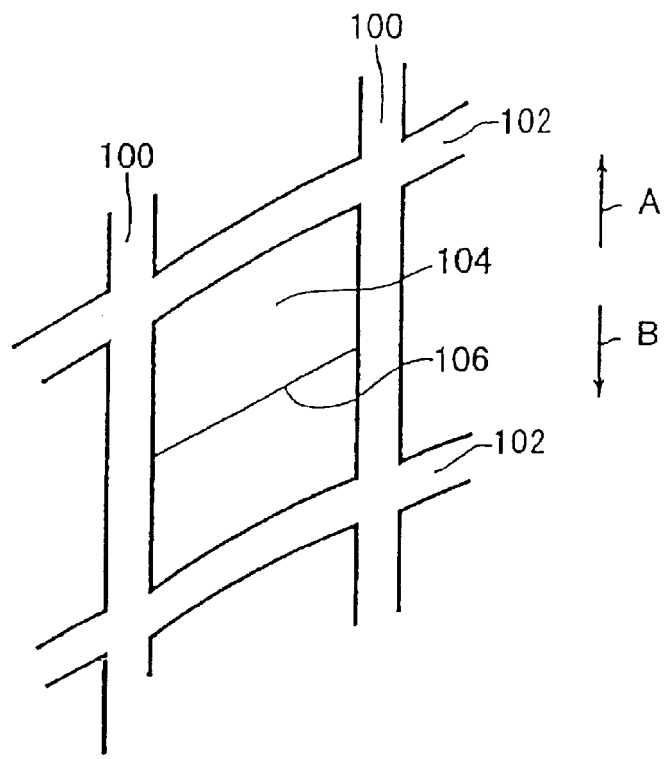
FIGS. 13A and 13B are top plan views of land portions having auxiliary grooves of the prior art.
Figure 13B:
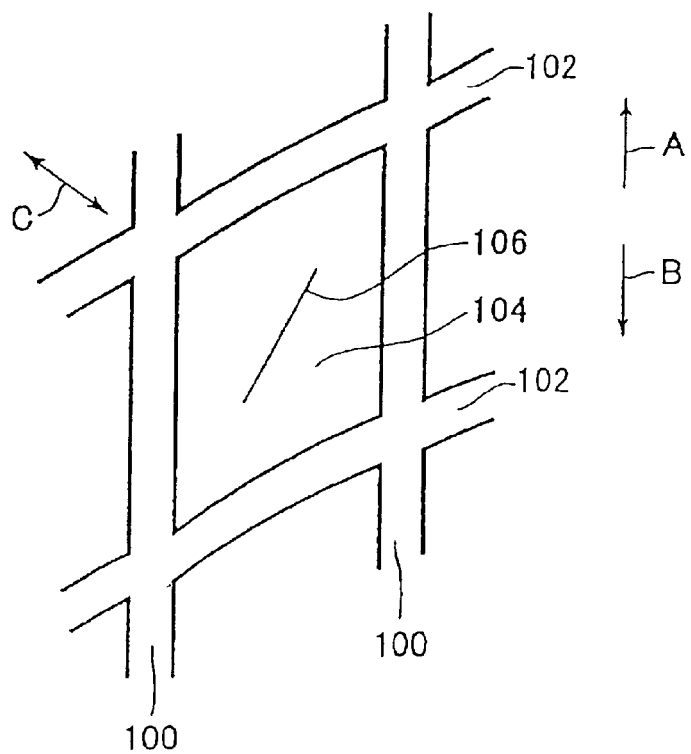

The tires of Test Example 1 are pneumatic tires 60 (for the front wheels) shown in FIG. 11 and pneumatic tires 62 (for the rear wheels) shown in FIG. 12. In the auxiliary groove 28, as formed in the land portion 26 of the tires 60 and 62 of Test Example 1, the central auxiliary groove portion 28A and the end portion auxiliary groove portions 28B are directly jointed to each other, and these jointed portions between the central auxiliary groove portion 28A and the end portion auxiliary groove portions 28B are sharply angled (not rounded).

The tires of Test Example 2 are the pneumatic tires 10 (for the front wheels) of the fourth embodiment and the tires 50 (for the rear wheels) of the second embodiment.

The evaluations of the lap time were exponentially expressed with respect to the reference time "100" of Test Example 1. The smaller exponent indicates the shorter lap time.

The evaluations of the partial wear were exponentially expressed with respect to the magnitude of the step of the heel-and-toe wear "100" as the reference which had occurred at the land portions of the tires of Test Example 1. The smaller exponent indicates the less partial wear and the higher excellence in the partial-wear resistance property.

The evaluations of the cracks were exponentially expressed with respect to the number of cracks "100" as the reference which had been formed in the land portion of the tires of Test Example 1. The smaller exponent indicates the smaller number of cracks formed and the higher excellence in the crack-resistance properties.

The grip-maintaining property is evaluated according to the feeling of the driver, and these evaluations were exponentially expressed with respect to the reference value "100" of the tires of Test Example 1. The larger exponent indicates the better grip-maintaining property.

TABLE 7

|  | Comparison | Embodiment |
| --- | --- | --- |
| (Best) Lap Time | 100 | 98 |
| (Average) Lap Time | 100 | 80 |
| Partial-Wear Resistance property | 100 | 80 |
| Crack-Resistance Properties | 100 | 50 |
| Grip-Maintaining Property | 100 | 125 |

(Test Example G)

There were prepared tires of two kinds for the test examples. These tires were attached by a car, and this car was run on the test course having a dry road surface to measure the best lap time and an average lap time (for ten laps). At the same time, the partial wear (i.e., the heel-and-toe) and the state of generation of cracks were observed after a run of a predetermined distance. Moreover, there were also examined the grip-maintaining property and the aquaplaning level during the running.

The aquaplaning level was evaluated according to the feeling of the test driver, and its evaluations were exponentially expressed with respect to the reference value "100" of Test Example 1. The larger exponent indicates the higher aquaplaning level.

TABLE 8

|  | Comparative Ex. | Example |
|---|---|---|
| (Best) Lap Time | 100 | 98 |
| (Average) Lap Time | 100 | 80 |
| Partial Wear Resistance | 100 | 80 |
| Cracking-resistance Properties | 100 | 50 |
| Grip-Maintaining Properties | 100 | 125 |
| Aquaplaning Level | 100 | 125 |

From the test results, it is found that the tires of Test Example 2 are superior to the tires of Test Example 1 for all the items of tests of running on the wet road surface.

What is claimed is:

1. A pneumatic tire comprising a tread including a plurality of substantially quadrilateral land portions each having an auxiliary groove arranged thereon, the land portions being defined by two sets of main grooves having a different angles with respect to a tire equatorial plane, characterized:

in that said auxiliary groove extends through said land portion from one side to another side;

in that said auxiliary groove includes: a central auxiliary groove portion inclined in the same direction as that of the shorter diagonal line of the land portion and arranged at the central portion of said land portion; end portion auxiliary groove portions extending in directions different from that of said central auxiliary groove portion and opened into the main grooves which are the closest to the end portion auxiliary groove portions; and connection portions jointing said central auxiliary groove portion and said end portion auxiliary groove portions smoothly; and in that said auxiliary groove includes chamfered portions formed at two corner portions of opened portions of said auxiliary groove, when viewed in a section normal to a longitudinal direction at each point of the longitudinal direction.

2. A pneumatic tire as set forth in claim 1, characterized in that said connection portions are formed into arcuate shapes having a radius of curvature of no less than 3 mm and no more than 10 mm.

3. A pneumatic tire as set forth in claim 1, or 2, characterized in that said central auxiliary groove portion has a length of less than 70% of the length of said shorter diagonal line.

4. A pneumatic tire as set forth in claim 1, characterized in that the angle formed between said shorter diagonal line and said central auxiliary groove portion is within ±20 degrees.

5. A pneumatic tire as set forth in claim 1, characterized in that said central auxiliary groove portion is arranged substantially on said shorter diagonal line.

6. A pneumatic tire as set forth in claim 1, characterized in that said central auxiliary groove portion has a depth of no less than 30% of the depth of said main grooves.

7. A pneumatic tire as set forth in claim 1, characterized in that the angle formed between said end portion auxiliary groove portions and the neighborhood main grooves, in which said end portion auxiliary groove portions are not opened, of said main grooves is no more than 30 degrees.

8. A pneumatic tire as set forth in claim 1, characterized in that said end portion auxiliary groove portions are as deep as or shallower than said central auxiliary groove portion.

9. A pneumatic tire as set forth in claim 8, characterized in that the depth of said end portion auxiliary groove portions is no less than 10% and less than 30% of the depth of said main grooves.

10. A pneumatic tire as set forth in claim 1, characterized in that said chamfered portions have a gently bulging sectional shape in said section normal to the longitudinal direction of said auxiliary groove.

11. A pneumatic tire as set forth in claim 1 or 10, characterized in that the maximum of the depth H of said chamfered portions is no less than 5% and no more than 50% of the groove depth D of said auxiliary groove.

12. A pneumatic tire as set forth in claim 1, characterized in that the maximum of the length L of said chamfered portions, as measured in parallel with the tread, in said section normal to the longitudinal direction of said auxiliary groove is no less than 5% and no more than 50% of the maxi-mum width W, as measured in the tire axial direction, of the land portion having said auxiliary groove.

13. A pneumatic tire as set forth in claim 1, characterized in that the depth H of said chamfered portions at each point in the longitudinal direction of said auxiliary groove is changed gently so that the change in the ground contact pressure which occurs inside the land portion under a lateral force is small.

14. A pneumatic tire as set forth in claim 13, characterized in that the depth H of said chamfered portions takes its maximum at the land portion ends of said auxiliary groove and at the central portion of the land portion.

* * * * *